US 11,481,976 B2

(12) United States Patent
Toschi

(10) Patent No.: US 11,481,976 B2
(45) Date of Patent: Oct. 25, 2022

(54) INSTRUCTION LIST GENERATION

(71) Applicant: RENESAS ELECTRONICS CORPORATION, Tokyo (JP)

(72) Inventor: Bjoern Toschi, Duesseldorf (DE)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/269,049

(22) PCT Filed: Nov. 27, 2018

(86) PCT No.: PCT/EP2018/082661
§ 371 (c)(1),
(2) Date: Feb. 17, 2021

(87) PCT Pub. No.: WO2020/108738
PCT Pub. Date: Jun. 4, 2020

(65) Prior Publication Data
US 2021/0183145 A1    Jun. 17, 2021

(51) Int. Cl.
*G06T 17/20* (2006.01)
*G06T 1/60* (2006.01)
(Continued)

(52) U.S. Cl.
CPC .............. *G06T 17/205* (2013.01); *G06T 1/60* (2013.01); *G06V 10/751* (2022.01)

(58) Field of Classification Search
None
See application file for complete search history.

(56) References Cited

U.S. PATENT DOCUMENTS 6,577,310 B1 * 6/2003 Kim .................... G06T 9/001
375/E7.084
7,671,857 B2 * 3/2010 Pulli ................... G06T 15/40
345/426
(Continued)

FOREIGN PATENT DOCUMENTS

JP    2009-231936 A    10/2009
JP    2009-267603 A    11/2009
(Continued)

OTHER PUBLICATIONS

International Search Report issued in corresponding International Patent Application No. PCT/EP2018/082661, dated Apr. 18, 2019.
(Continued)

*Primary Examiner* — Tize Ma
(74) *Attorney, Agent, or Firm* — McDermott Will & Emery LLP

(57) ABSTRACT

A system for and a method of generating an ordered list of instructions comprising a list of pixel coordinates which are vertices of triangles in a strip of a reference input image in a source coordinate system such that transformation of the vertices to a corresponding output image in a destination coordinate system causes the triangles to be mapped to a block of image data which maps to a block of line memory (or "texture cache"). The method comprises dividing the reference output image into a plurality of tiled sections in the destination coordinate system. The method comprises, for each section, defining first and second boundaries of an array of strips of pixels in the section by dividing the section into blocks of line memory. The method comprises, for each strip, dividing each set of pixels contained in each strip into a series of ordered triangles, generating a set of destination and source coordinates for each vertex of each triangle in the strip and storing the coordinates of the vertices in source and (Continued)

destination coordinate system, in the ordered list of instructions.

20 Claims, 23 Drawing Sheets

(51) Int. Cl.
  *G06K 9/62* (2022.01)
  *G06V 10/75* (2022.01)

(56) References Cited

U.S. PATENT DOCUMENTS

| | | |
|---|---|---|
| 9,818,201 B2 | 11/2017 | Mallet |
| 2008/0225047 A1 | 9/2008 | Pulli et al. |
| 2011/0310102 A1 | 12/2011 | Chang |
| 2020/0143590 A1* | 5/2020 | Gruen .................. G06T 17/205 |

FOREIGN PATENT DOCUMENTS

| | | |
|---|---|---|
| JP | 2010-257357 A | 11/2010 |
| WO | 2005/116930 A1 | 12/2005 |

OTHER PUBLICATIONS

Transmittal of the International Search Report and the Written Opinion of the International Searching Authority for PCT/EP2018/082661, dated Apr. 18, 2019.
Transmittal of International Preliminary Report on Patentability and Written Opinion of the International Searching Authority for PCT/EP2018/082661, dated Jun. 10, 2021.
Japanese Notice of Reasons for Refusal issued in corresponding Japanese Patent Application No. 2021-529818, dated May 31, 2022, with English translation.

* cited by examiner

INSTRUCTION LIST GENERATION

CROSS REFERENCE TO RELATED APPLICATIONS

This application is the U.S. National Phase under 35 U.S.C. § 371 of International Application No. PCT/EP2018/082661, filed on Nov. 27, 2018, the entire contents of each are hereby incorporated by reference.

FIELD

The present invention relates to generating an ordered list of instructions, such as a display list for use in texture-mapping-based image distortion correction.

BACKGROUND

Motor vehicles increasingly are being equipped with multiple camera systems capable of feeding live video which can be used to assist a driver of a vehicle while driving or parking. For example, use cases include a front camera or surround view for road sign detection, road lane detection, parking lane markers, pedestrian detection and the like. Wide-angle or fisheye lenses are often used with these systems to capture the widest field of view possible with a single camera. Images captured using these types of lenses are, however, distorted, making them difficult to interpret and/or process. Many vision and post processing algorithms in use on motor vehicles rely on "same scale" objects, for example, in order to determine a distance to a pedestrian. Image distortion correction is preferably performed in real time. An example of image distortion correction can be found in JP 2009 267603 A.

Texture mapping may be used to correct image distortion. Lens distortion correction can be in the form of "standard" rectilinear projecting lenses (removing deviation from perfectly rectified images) and image rectification (especially important with "FishEye" lenses, which usually have different projection compared to standard lenses). Additionally, it is possible to apply different mapping, for example, cylindrical mapping, and also different projections, for example a "3D" projection or surround view ("Human Vision") usually using a 3D "Bowl" or Image Planes. For some tasks (e.g. panoramic reconstruction) only distortion correction, without rectification, may be applied for certain lenses.

Texture mapping involves performing a transformation between a distortion-corrected polygonal mesh and a warped polygonal mesh. Texture coordinates of vertices of polygons of the warped mesh in a source coordinate system are assigned corresponding coordinates in an undistorted destination coordinate system. These coordinates along with associated commands are stored as an ordered list of instructions. The ordered set of instructions can take the form of a display list. A display list can include command code and data which can include writing registers ("register setup"), synchronization (such as cache flushing, interrupts, inter-IP-synchronization and the like) and triangle commands (which are followed by N coordinates).

An ordered list of instructions, such as a display list, can be generated either online (i.e., during run-time) which can occur in real-time or near real-time, or offline. The timing of generation may depend on use-case or a vendor. For example, a display list for a front camera may be re-generated every few minutes or tens of minutes to adjust for changes in lens distortion due to thermal stress, road influence and the like. An ordered list of instructions can be used to determine which pixels of a new distorted image to load into cache memory and to map into the undistorted image.

Image data can be handled using cache line memory. Areas of an image are loaded on demand (i.e. on cache miss) into the cache line memory, or they may be preloaded. Areas are loaded implicitly by the hardware. For example, the hardware may request texture data in (u, v) coordinates, mapping to 2×16 cache lines of 256 bytes each.

In some examples, multi-way cache is not used and there is no random replacement. Texture mapping function may be performed and an undistorted area of the output image is stored. An example of texture mapping can be found in US 2015/0254820 Ai.

Storing texture mapping image data in cache memory can, however, have one or more drawbacks. Source-cache misalignment can be a problem, especially with high distortion lenses, for example, a wide-angle lens. For example, cache trashing may occur if polygon-strips span multiple areas of the image (i.e. lines) which map to the very same cache lines in the texture cache. This may exceed a memory bandwidth leading to excessive performance penalties.

SUMMARY

According to a first aspect of the invention there is provided a method of generating an ordered list of instructions. The ordered list of instructions comprises a list of pixel coordinates which are vertices of triangles in a strip of a reference input image in a source coordinate system such that transformation of the vertices to a corresponding output image in a destination coordinate system causes the triangles to be mapped to a block of image data which maps to a block of line memory (herein referred to as a "texture cache"). The method comprises dividing the reference output image into a plurality of tiled sections in the destination coordinate system. The method comprises, for each section, defining first and second boundaries of an array of strips of pixels in the section by dividing the section into blocks of line memory. The method comprises, for each strip, dividing each set of pixels contained in each strip into a series of ordered triangles, generating a set of destination and source coordinates for each vertex of each triangle in the strip and storing the coordinates of the vertices in source and destination coordinate system, in the ordered list of instructions Thus, transformation of the vertices to the corresponding output image in the destination coordinate system can cause the triangles to be mapped to the block of image data which maps to a block of line memory such that, when read out, there is reduced or no cache trashing.

The method may further comprise determining a number of strips in each section by transforming corners of each of a plurality of tiled sections in the destination coordinate system into the source coordinate system to generate a plurality of transformed sections. The method may further comprise, for each transformed section, determining a widest span in the v dimension in pixels and dividing a number of pixels spanning the v dimension by the height of the block of line memory.

The method may further comprise defining the boundaries of each strip in the array of strips for each section by determining a starting point and a finishing point based upon a largest span between a highest and lowest v-coordinate of an edge of a section in source coordinates. The method may further comprise iteratively creating pairs of initial hit-points starting at the starting point and moving clockwise and counter clockwise towards the end point wherein a distance between adjacent initial hit-points on the edge is determined by a triangle size. The method may further comprise generating initial hit-lines between each pair of initial hit-points to form boundaries of the strips.

The method may further comprise defining the boundaries of each strip by iteratively moving initial hit-points along the edge to generate refined hit-points and generating refined hit-lines between pairs of the refined hit-points.

The method may further comprise defining the boundaries of each strip by generating a series of intermediate line points along the refined hit-lines wherein a distance between the refined hit-points and the intermediate line points is determined by the triangle size. The method may further comprise moving intermediate line points orthogonally to refined hit-line to match the v coordinate in the source coordinate system of a refined hit-point to generate final position intermediate hit-points and generating final position hit-lines between each pair of refined hit-points which intersect final position intermediate hit-points.

The method may further comprise adding a first line to the edge adjacent to the starting point in either a clockwise or counter clockwise direction to define a boundary of the first strip of the section.

The method may further comprise adding a last line to the edge adjacent to the finishing point in either a clockwise or counter clockwise direction to define a boundary of the last strip of the section.

The method may further comprise adding each corner of the section to strips containing those corners as vertices before generating the triangles.

The method may further comprise determining vertices of a first triangle generated in each strip by comparing a first distance L1 between a first point on a first boundary and a second point on a second boundary, with a second distance L2 between the first point on the second boundary and second point on the first boundary where when the first distance L1 is greater of equal to the second distance L2 the first two point on the first boundary are used as triangle vertices and where the second distance L2 is greater than the first distance L1, the first two points on the second boundary are used as triangle vertices.

The method may further comprise determining a culling direction of a first triangle in strip by the cross product of a vector from a first vertex to a second vertex of a first triangle and a vector form the first vertex to a third vertex of the first triangle wherein a positive cross produce results in a clockwise culling direction and a negative cross product results in a counter clockwise culling direction.

The method may further comprise alternating the culling direction of consecutively rendered triangles in a strip between the first triangle culling direction and an opposite culling direction.

The method may further comprise maintaining the same culling direction of adjacent triangles in a strip is the same.

The ordered list of instructions may be a display list.

The ordered list of instructions may be optimal texture-access meshes for a GPU.

The ordered list of instructions may be OpenGL Draw commands.

The ordered list of instructions may be Microsoft® DirectX® Draw commands.

The ordered list of instructions may be stored as a mesh.

According to a second aspect of the invention there is provided a method of correcting a distorted image. The method comprises receiving a distorted image from system memory into a texture cache, texture mapping triangles of the distorted image using coordinates of vertices of the triangles stored in an ordered list of instructions stored in system memory onto a distortion-corrected image; and storing this in a destination cache. The ordered list of instructions comprises a lists of pixel coordinates which are vertices of triangles in a strip of a reference input image in a source coordinate system and a destination coordinate system such that transformation of the vertices in the source coordinate system to a corresponding output image in a destination coordinate system causes the triangles to be mapped to a block of image data which maps to a block of line memory, or "texture cache", such that when read out there is no cache trashing confined within a block of line memory. The ordered list of instruction is generated by dividing the reference output image into a plurality of tiled sections in the destination coordinate system. The method comprises, for each transformed section defining first and second boundaries of an array of strips of pixels by allocating the transformed region into blocks of line memory. The method comprises, for each strip, dividing each set of pixels contained in each strip into a series of ordered triangles, generating a set of destination and source coordinates for each vertex of each triangle in the strip, storing the coordinates of the vertices in source and destination coordinate system, in the ordered list of instructions.

According to a third aspect of the invention there is provided a computer program comprising instructions which when executed by one or more processors causes the one or more processors to perform the method according to the first aspect.

According to a fourth aspect of the invention there is provided a computer program product comprising a computer-readable medium storing the computer program of the third aspect.

According to a fifth aspect of the invention there is provided a module configured to perform the method of the second aspect.

The module according to may be a hardware module.

According to a sixth aspect of the invention there is provided a monolithic integrated circuit comprising a processor subsystem comprising at least one processor and memory; and the module of the fifth aspect.

According to a seventh aspect of the invention there is provided a system comprising: at least one camera for providing distorted image data and an integrated circuit of the sixth aspect arranged to receive distorted image data from the at least one camera.

According to an eighth aspect of the invention there is provided a motor vehicle comprising the system of the seventh aspect.

The motor vehicle may be a motorcycle, an automobile (sometimes referred to as a "car"), a minibus, a bus, a truck or lorry. The motor vehicle may be powered by an internal combustion engine and/or one or more electric motors.

According to a ninth aspect of the invention there is provided a computer system for generating an ordered list of instructions comprising a list of pixel coordinates which are vertices of triangles in a strip of a reference input image in a source coordinate system [u, v] such that transformation of the vertices to a corresponding output image in a destination coordinate system [x, y] causes the triangles to be mapped to a block of image data which maps to a block of line memory (or "texture cache") such that when read out there is no cache trashing confined within a block of line memory. The computer system comprises at least one processor and memory. The at least one processor is configured to perform the method of the first aspect.

According to a tenth aspect of the invention there is provided a display list comprising a list of pixel coordinates which are vertices of triangles in strips of a reference input image in a source coordinate system and a corresponding list of coordinates in a destination coordinate system. The lists of pixel coordinates are configures such that the vertices in a single strip in the source coordinate system are mapped to a block of image data which maps to a block of line memory (or "texture cache") and when the vertices in the source coordinate system are rendered into triangles in the destination coordinate system, they form a reference output image without unnecessary cache trashing.

According to an eleventh aspect of the invention there is provided a computer readable medium storing the display list of the tenth aspect.

BRIEF DESCRIPTION OF THE DRAWINGS

Certain embodiments of the present invention will now be described, by way of example, with reference to the accompanying drawings in which.

DETAILED DESCRIPTION OF CERTAIN EMBODIMENTS

System Overview

Figure 1:
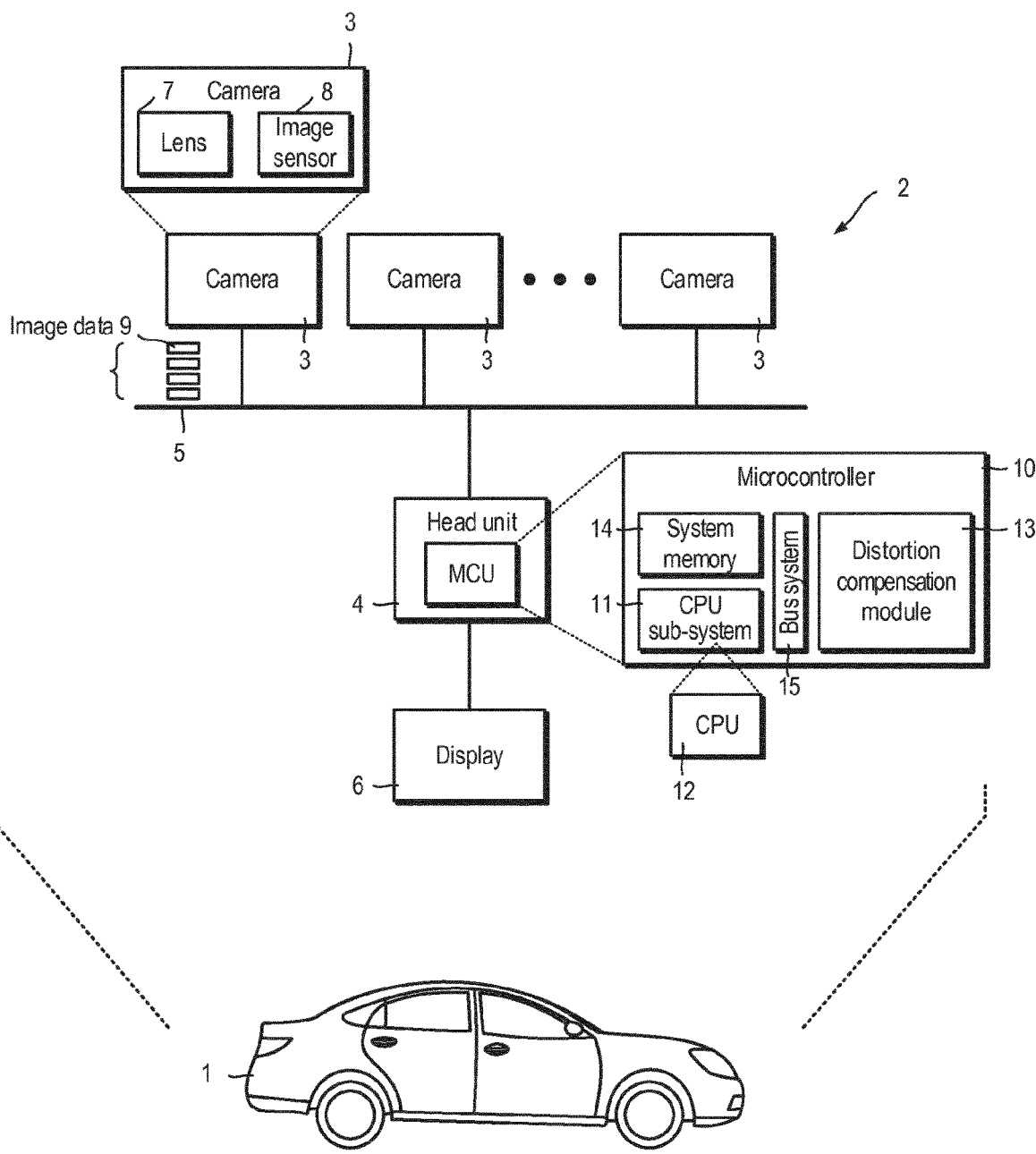
FIG. 1 illustrates a motor vehicle which includes one or more cameras generating distorted images and a distortion compensation module.

Referring to FIG. 1, a motor vehicle 1 is shown.

The motor vehicle 1 includes an advanced driver assistance system 2. The system 2 includes a plurality of digital or analogue cameras 3, a head unit 4 connected to an in-vehicle communications bus 5. The system 2 may include a display 6 connected to the head unit 4. The display 6 can take the form of a flat-panel display located, for example, in a centre console (not shown) or dashboard (not shown).

Each digital or analogue camera 3 includes a lens 7, for example a wide-angle lens, and an image sensor 8. Each camera 3 is capable of capturing image data 9 (or "image frame") in a sequence of image frames (or "pictures") for example, at a rate of 60 fps. The image data 9 is transmitted in one or more data frames via an in-vehicle communications interface 5 to the head unit 4. The in-vehicle communications interface may be, for example, a communication bus, a MIPI CSI-2 via parallel interface, a serial interface, Ether/AVB or PCI-Express.

The head unit 4 includes a microcontroller 10 or other similar microprocessor-based system. The microcontroller 10 includes a central processing unit (CPU) sub-system 11 which includes a CPU 12, a distortion compensation module 13, system memory 14 and a bus system 15. The microcontroller 10 includes other peripheral modules (not shown), such as other communications network controllers (for other different types of communications network), timers and the like.

The image data 9 are temporarily stored in system memory 14 and may be processed in real-time by the distortion compensation module 13.

As will be explained in more detail hereinafter, the distortion compensation module 13 performs image distortion correction using texture mapping on the distorted image data 9 and outputs a corrected image 23 (FIG. 6) via the bus system 15 to the system memory 14. The corrected image 23 (FIG. 6) may be displayed on the display 6.

Image Distortion Compensation Processing

Figure 2:
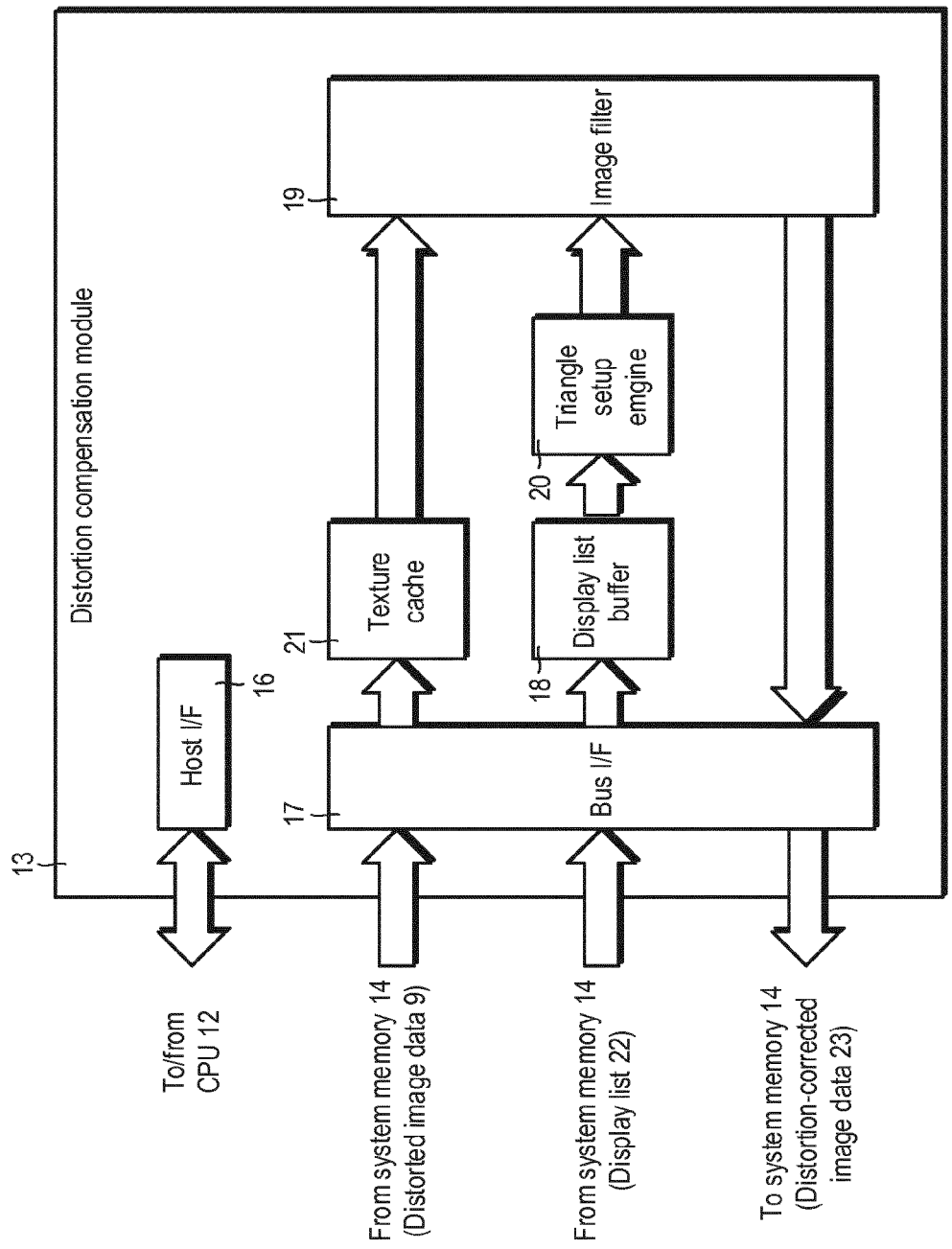
FIG. 2 is a first schematic block diagram of a distortion compensation module.

Referring to FIG. 2, the distortion compensation module 13 is shown in more detail.

The distortion compensation module 13 includes a host interface 16, a bus interface 17, a display list buffer 18, an image filter 19, a triangle setup engine 20, and a texture cache 21.

The bus interface 17 receives display lists 22 from the system memory 14 and feeds the display lists 22 into the display list buffer 18. The display lists 22 are then fed into a triangle setup engine 20. Distorted image data 9 received from the system memory 14 is fed into the texture cache 21 before being passed to the image filter 19. The CPU 12 can configure and control the distortion compensation module via the host interface 16.

Figure 3:
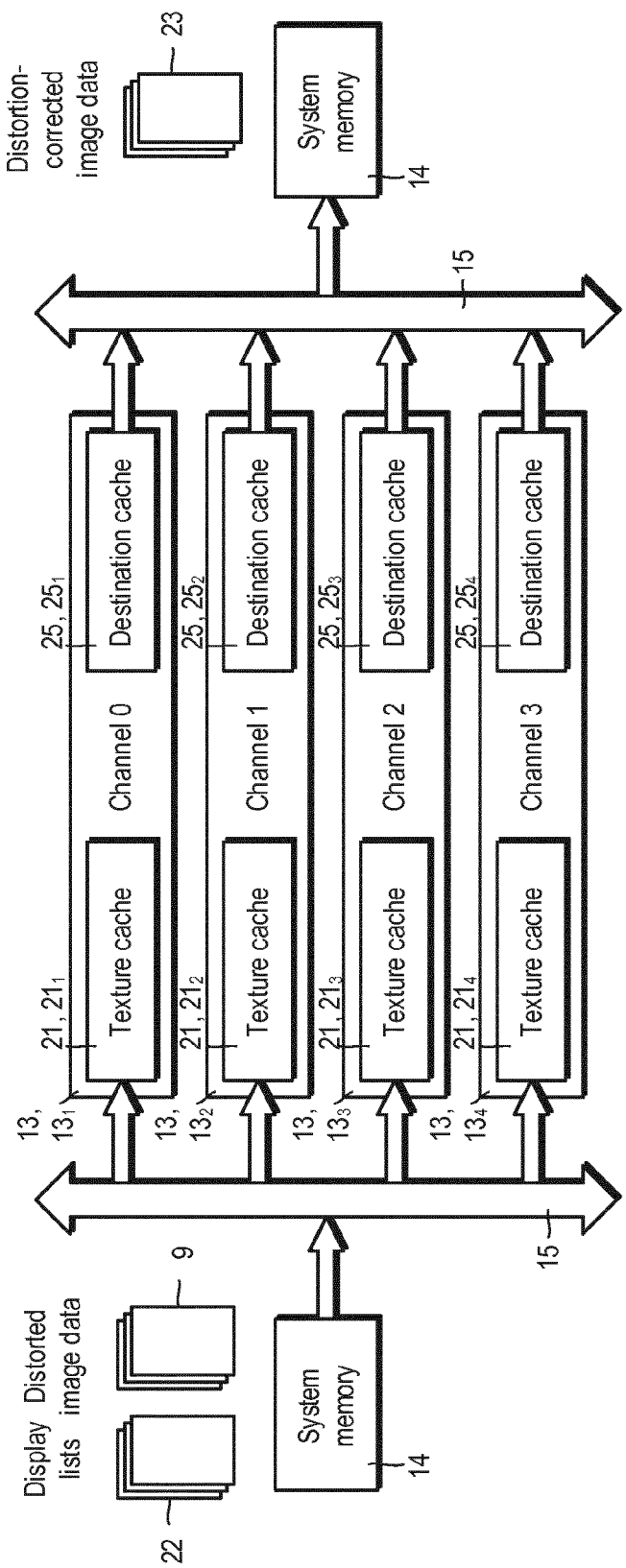
FIG. 3 is a second schematic block diagram of a distortion compensation module.

Referring to FIG. 3, multiple distortion compensation modules $13_1$, $13_2$, $13_3$, $13_4$ can be used to process image data simultaneously. Each module $13_1$, $13_2$, $13_3$, $13_4$ has a respective texture cache $21_1$, $21_2$, $21_3$, $21_4$ and a destination cache $25_1$, $25_2$, $25_3$, $25_4$. Each of the distortion compensation modules may share AXI Master interfaces on input/output.

A display list 22 contains an ordered list of commands. These may include render start commands (or "TRI commands") which instruct the module to read-in N following vertices forming a triangle strip which is then rendered, Write Register(s) commands and synchronisation commands. Each TRI command may contain one of either an ordered set of coordinates in a source coordinate system 30 (FIG. 5), a corresponding ordered set of coordinates in a destination coordinate system 32 (FIG. 6), or colour and/or luminescence correction values.

The ordered set of coordinates in the source coordinate system 30 (FIG. 5) define a portion of distorted image data 9. The ordered list of coordinates in a destination coordinate system 32 (FIG. 6) defines a portion of distortion-corrected image data 23.

The display list 22 is stored in system memory 14 ready to be fed via bus 15 into the distortion compensation module 13 via the display list buffer 18 (FIG. 2). The display list buffer 18 requests new data when buffer runs empty. Image data 9 referenced by each triangle defined by the display list 22 is fed to the texture cache 21 and then texture-mapped into a distortion-corrected destination coordinate system 32 (FIG. 6) to form distortion-corrected image data 23. Distortion-corrected image data 23 is fed to the destination cache 25 or a local SRAM which can hold a rectangular part of the final image. For example, a local SRAM may provide storage for 256 lines consisting of 512 bytes each, forming a rectangular portion of the resulting image, which is 256× 256 pixels in 16 bits per pixel mode or 512×256 pixels in 8 bits per pixel mode.

The distortion-corrected image data 23 are stored in system memory 14 using cache line eviction or using special commands to flush the cache or transfer the SRAM to system memory.

Other ordered list of commands may be created. For example, optimal texture-access meshes for GPU (i.e. OpenGL display lists) cache-layout can be estimated (TAG creation and regions which can be held without cache trashing). OpenGL Draw commands, and Microsoft® DirectX® Draw commands may be created. The ordered list of commands may be stored as a mesh, for example, a 3D model containing texture coordinates.

Figure 4:
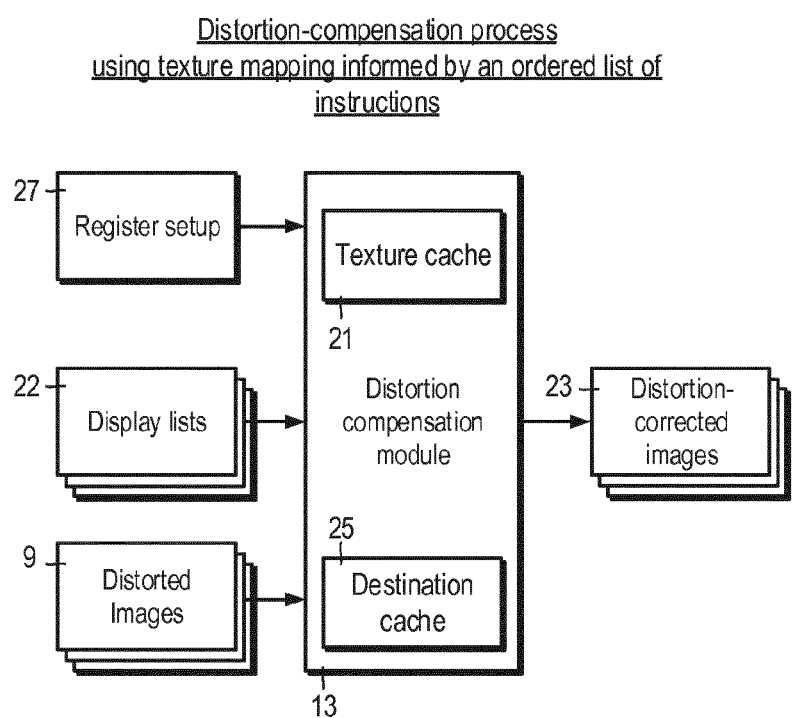
FIG. 4 schematically illustrates use of display lists during image distortion compensation.

Referring to FIG. 4, the distortion compensation module 13 may also have a register setup 27. The register setup 27 sets up a format or formats of the ordered list of commands in the display list 22. The formats may include an image plane I/O setup which includes a physical memory address, a width, a height and strides. The formats may include colour formats, triangle formats, render flags and control registers. An underlying state machine may be altered using certain commands, for example, in OpenGL cull direction (clockwise vs counter-clockwise) may be altered.

The distortion compensation module 13 may require that each line of the image data 9 has to start on aligned memory locations (i.e. for input on multiple of 256 bytes, thus lower 8 bits needs to be all zero). This situation may arise, for example, due to cache implementation or for other reasons. For example, an image of 1080×1920 pixels in a 2 bytes per pixel (16 bits per pixel) format may need to have an additional "padding" of 128 pixels to let the next line start on an aligned location (multiples 256 bytes). In such a scenario, the stride (i.e. the offset between lines) needs to be set to 2048 bytes.

Figure 5:
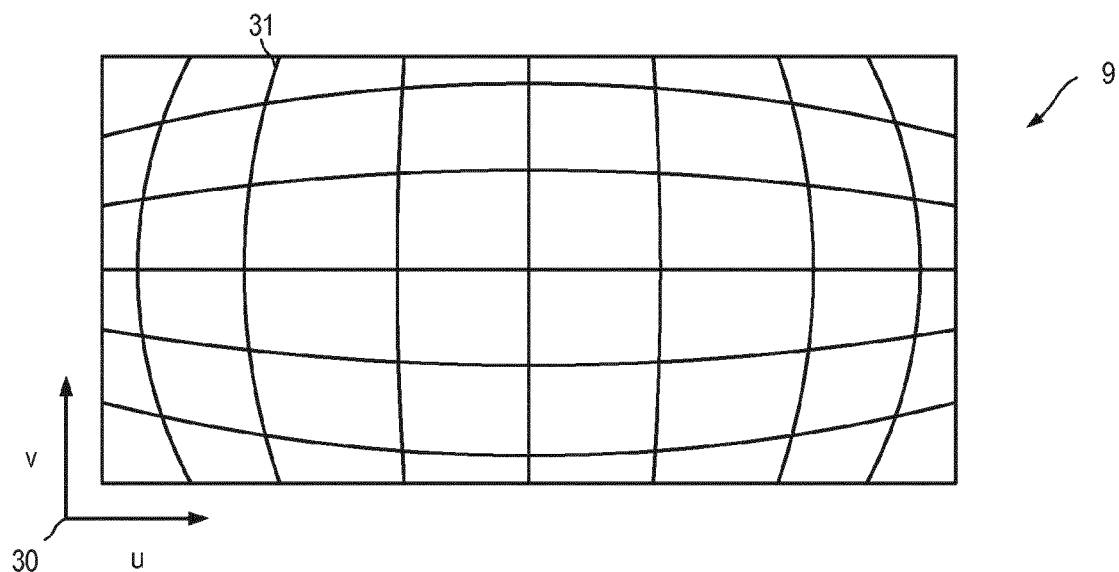
FIG. 5 illustrates an example of a distorted image with source coordinates u, v.

Referring to FIG. 5, an example of a distorted image 9 taken by a camera 3 in a source coordinate system (u, v) 30 is shown. Distortion is illustrated by superimposed grid lines 31 typical of that caused by wide-angle and fish-eye lenses. The rectangular image 9 typically has a size of 1920×1080 pixels. However, the image 9 can be larger or smaller, and/or have a different aspect ratio.

Figure 6:
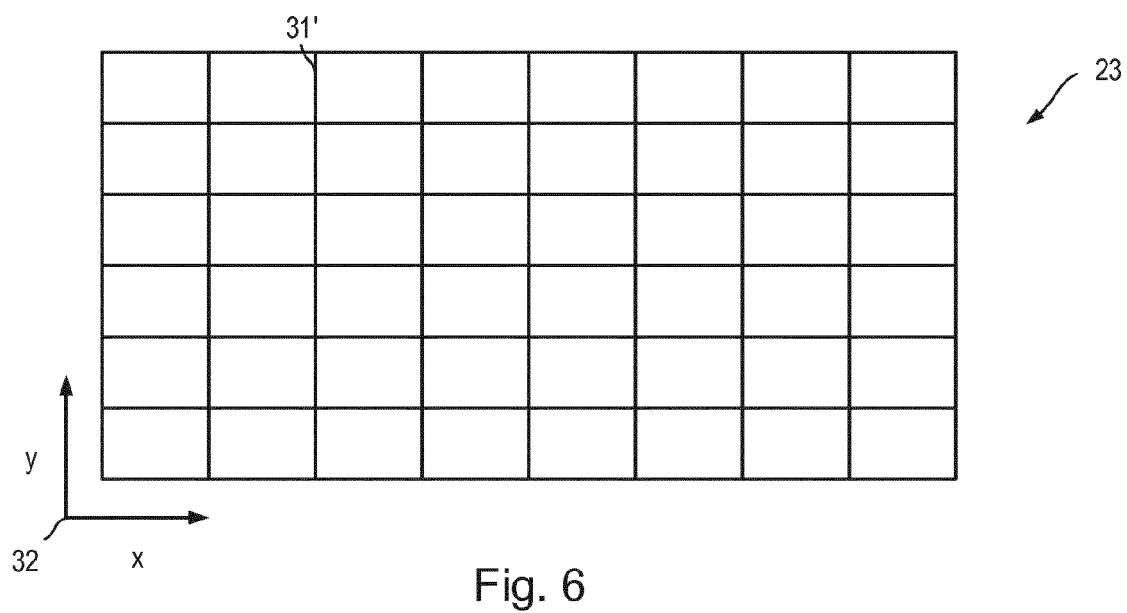
FIG. 6 illustrates an example of a distortion-corrected image with destination coordinates x, y.
Figure 7:
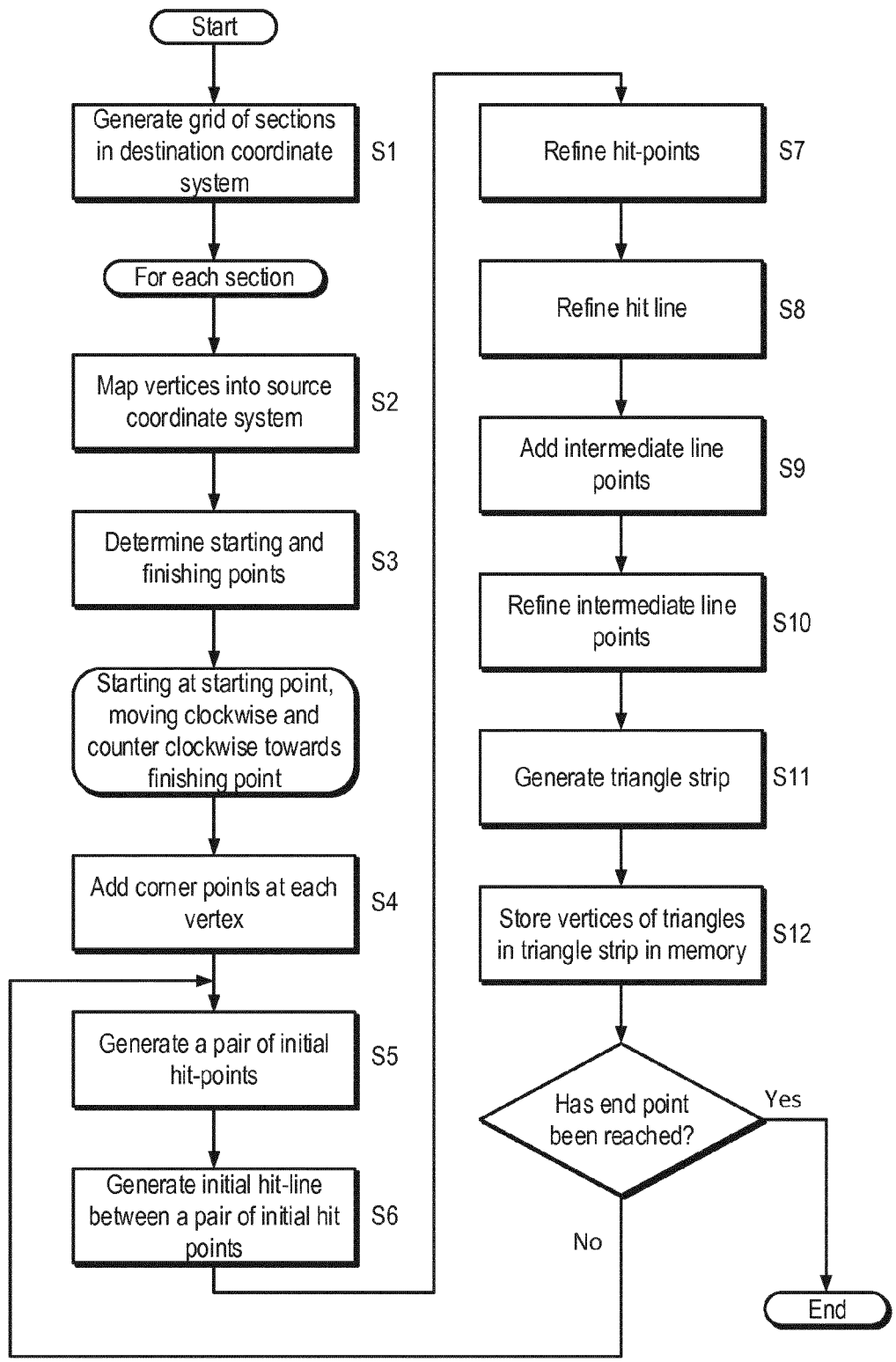
FIG. 7 is a process flow diagram of a method of generating an ordered list of coordinates.
Figure 8:
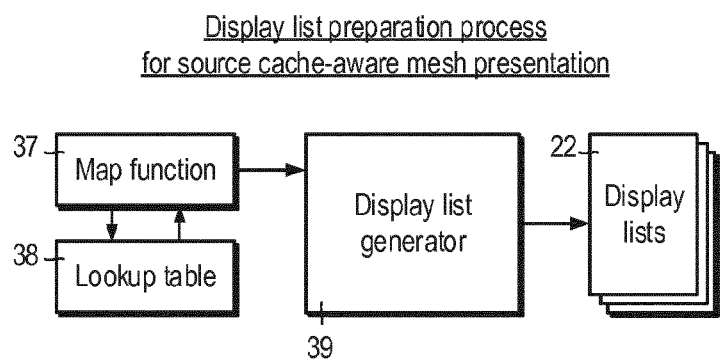
FIG. 8 is a schematic block diagram of a display list generation module.
Figure 9:
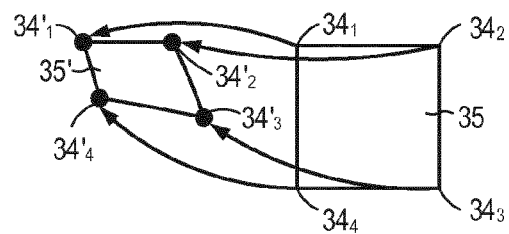
FIG. 9 illustrates a section of a reference input image in destination coordinates x, y being mapped into source coordinates u, v.

Referring to FIG. 6, an example of a distortion corrected image 23 in a destination coordinate system (x, y) 32 is shown. Superimposed gridlines 31' correspond to the gridlines 31 (FIG. 5) in the source coordinate system 30. The gridlines 31' appear straight and evenly spaced across the image 23, indicating distortion has been corrected.

Display List Creation

Referring to FIGS. 7 to 30, a method of generating display lists 22 will now be described.

Mapping

Referring particularly to FIGS. 7 to 11, a reference image 33 (which may also be referred to as a "calibration image") in the destination coordinate system 32 is used to generate vertices $34_1$, $34_2$, $34_3$, $34_4$ of sections 35 (step S1). Each of the vertices $34_1$, $34_2$, $34_3$, $34_4$ of each section 35 is mapped to a source coordinate system 30 (step S2). The reference image 33 may have the same dimensions as distorted image data 9. However, the reference image 33 may also have the dimensions, aspect ratio and resolution of a region of interest (ROI) of the input image data 9. For example, a reference input image 33 with dimensions of 1536 pixels×512 pixels may be used to isolate a particular ROI of input image data 9 with dimensions of 1920 pixels×1080 pixels. Each reference image 33 is the perfect image of the real-world calibration pattern, that is, has known dimensions and no distortion in the destination coordinate system 32.

Mapping is performed by map function 37 which provides a distortion-correction formula and may also provide the image projection, for example, surround view. Possible distortion-correction formulas include an inverse Brown-Conrady Formula, "OpenCV" distortion formula, or using the lookup table 38. However, other image distortion compensation models can be used. The map function 37 is preferably performed by CPU 12 (FIG. 1). Mapping generates vertices $34_1'$, $34_2'$, $34_3'$, $34_4'$ and sections 35' in a source coordinate system 30. Mapped sections 35' are fed into display list generator 39 which generates an ordered list of commands which may be stored as display lists 22.

Each section 35 has four sides. However, each section 35 may have three or more sides. Sections with different numbers of sides may be used when dipping the image, for example, when a single camera does not map to a whole screen.

Figure 10:
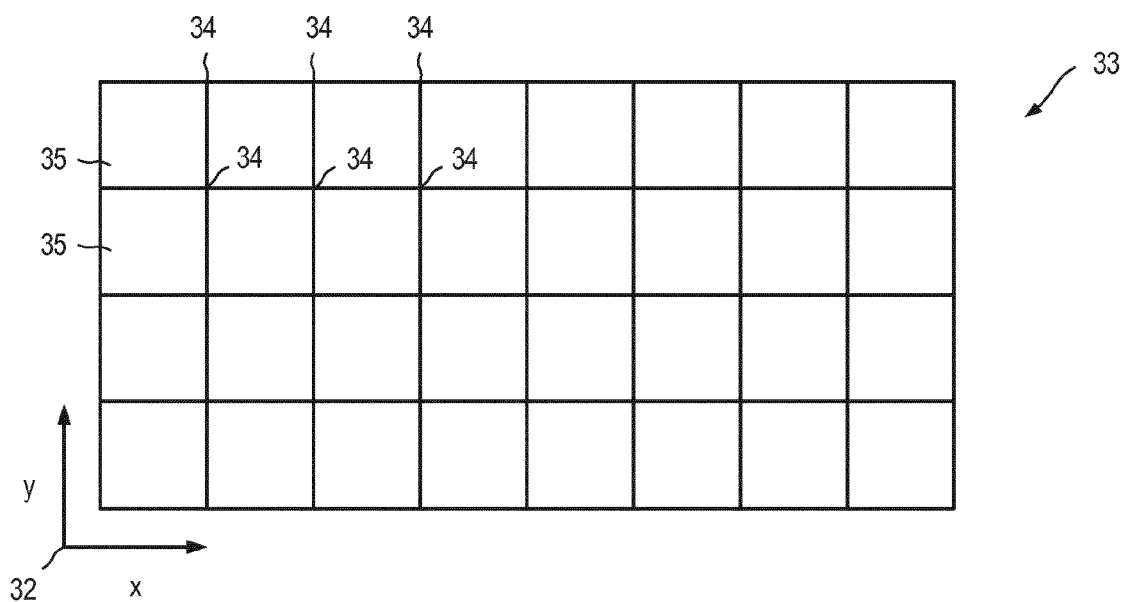
FIG. 10 illustrates a reference image in destination coordinates x, y divided into sections.

Referring in particular to FIG. 10, the reference image 33 in a destination coordinate system 32 is divided into thirty-two equal square sections 35. The reference image 33 can be divided into any number of sections 35. The sections 35 can have any shape. Each section 35 can be of any size equal to or smaller than the reference image 33. Sections 35 may have equal size and shape. Sections 35 may have a size of 64×64 pixels or 128×64 pixels. However, the sections 35 may have other sizes, for example, 256×256 pixels, 512×128 pixels or 512 bytes×256 lines. The reference image 33 may be rectangular and may have a size of 1920×1080 pixels.

Each section 35 of the reference image 33 is mapped from destination coordinates (x, y) 32 into source coordinates (u, v) 30 by evaluating the map function 37 at the corner points 34.

Figure 11:
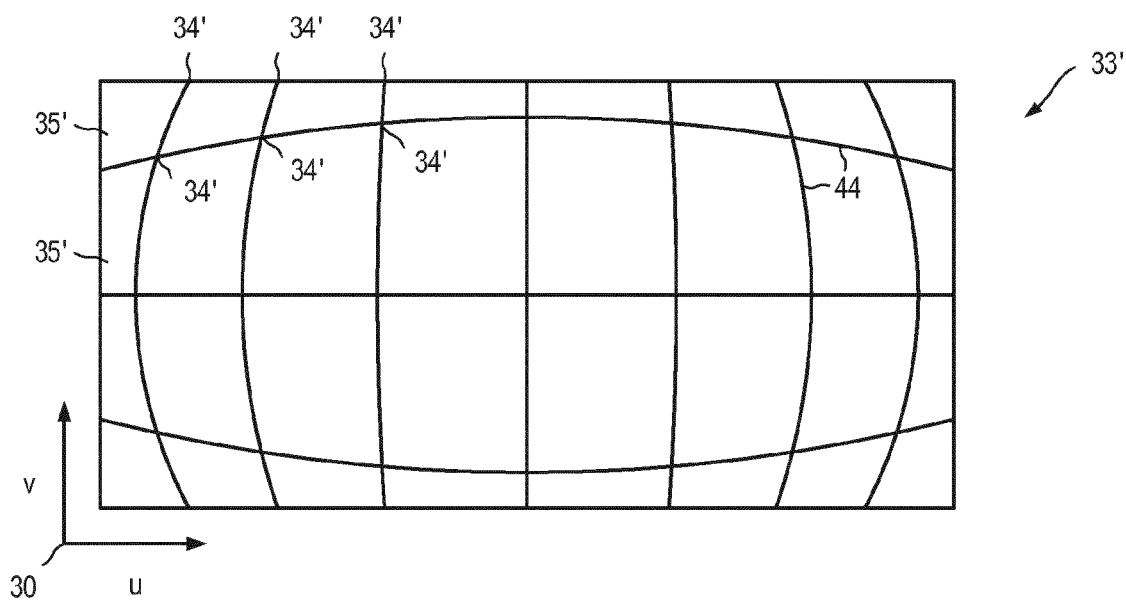
FIG. 11 illustrates a reference image in source coordinates u, v divided into sections corresponding to the image shown in FIG. 10.

Referring in particular to FIG. 11, each section 35 in the reference image 33 is mapped from destination coordinates 32 into source coordinates 30 using map function 37. To aid clarity, mapped sections 35' in source coordinates 30 are shown adjacent to each other in FIG. 10 illustrating the whole mapped image 33' in source coordinates 30. The reference image 33' may be rectangular and may have a size of 1920×1080 pixels.

Hit-Point and Hit-Line Generation

Figure 12:
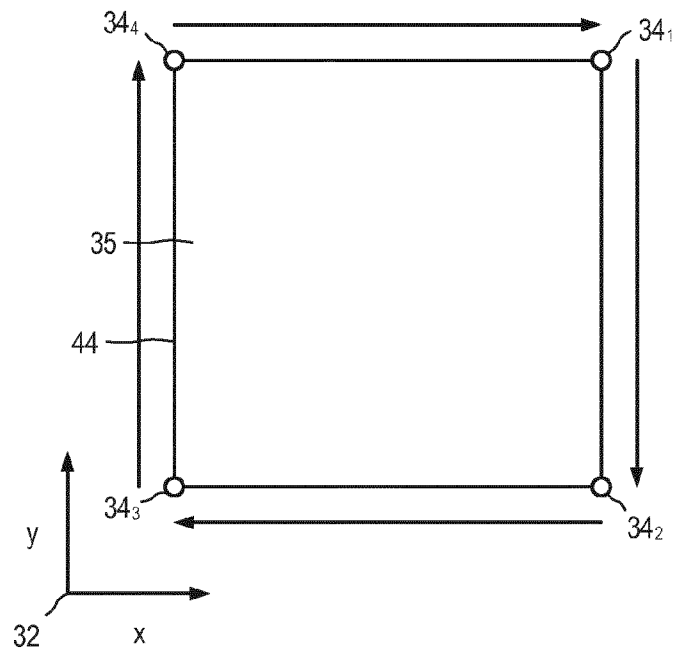
FIG. 12 illustrates a section of a reference image in destination coordinates, x, y.
Figure 13:
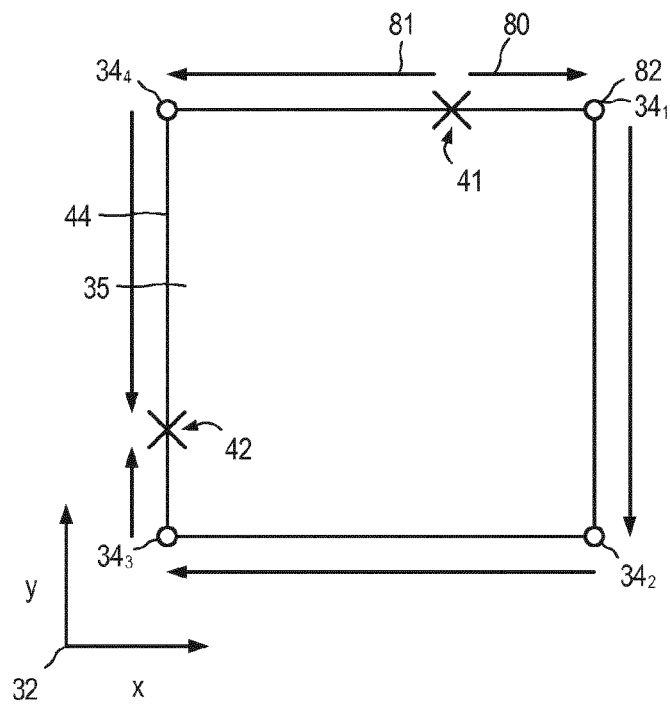
FIG. 13 illustrates the section of a reference image shown in FIG. 12 where starting and finishing corner points have been determined.

Referring to FIGS. 12 and 13, a starting point 41 and a finishing point 42 are determined for each section 35 (step S3). The starting point 41 and the finishing point 42 are located at either a minimum or a maximum v coordinate along edges 44 of each section 35. The maximum and minimum v coordinates for each section 35 are determined by mapping each pixel 46 along the edges 44 from the destination coordinate system [x, y] 32 into the source coordinate system [u, v] 30, and evaluating the values of the v coordinates for each pixel 46.

If the starting point 41 is located at the minimum v value, the finishing point 42 is located at the maximum v value. If the starting point 41 is located at the maximum v value, the finishing point 42 is located at the minimum v value. For cases of multiple extrema (i.e., multiple minima or multiple maxima v coordinates) along the edges 44, one minimum point and one maximum point is picked to be the starting point 41 and one to be the finishing point 42.

Both the starting point 41 and the finishing point 42 include the source coordinates (u, v) 30 and the destination coordinates (x, y) 32.

A clockwise path 80 and a counter clockwise path 81 are generated from a starting point 41 moving along edges 44 until reaching a finishing point 42. Corner points 82 are added at each vertex while travelling along the clockwise path 80 and the counter clockwise path 81 (step S4). If the minimum or maximum v coordinate is at a vertex 34, no corner point 82 is added at that vertex 34.

Referring particularly to FIG. 13, the clockwise path generated moves from a starting point 41 along an edge 44 to the first encountered vertex 341, then along an edge 44 to the next encountered vertex 342, then along an edge 44 to the final encountered vertex 343 and then along an edge 44 until a finishing point 42 is reached. The counter-clockwise path moves from a starting point 41 along an edge 44 to the first encountered vertex 344 and then along an edge 44 until a finishing point 42 is reached.

Figure 14:
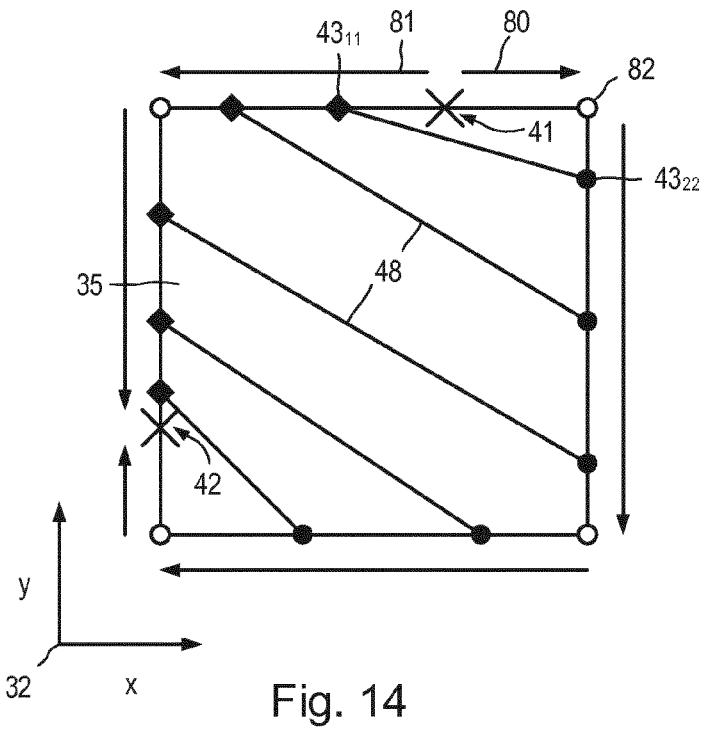
FIG. 14 illustrates the section of a reference image shown in FIG. 12 where hit points and hit lines have been added.
Figure 15:
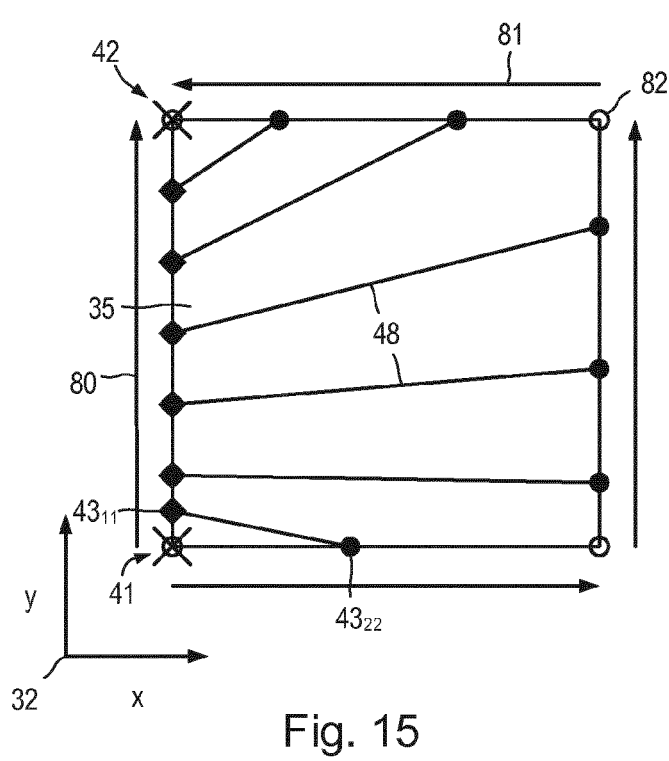
FIG. 15 illustrates the section of a reference image shown in FIG. 12 where hit points and hit lines have been added.
Figure 16:
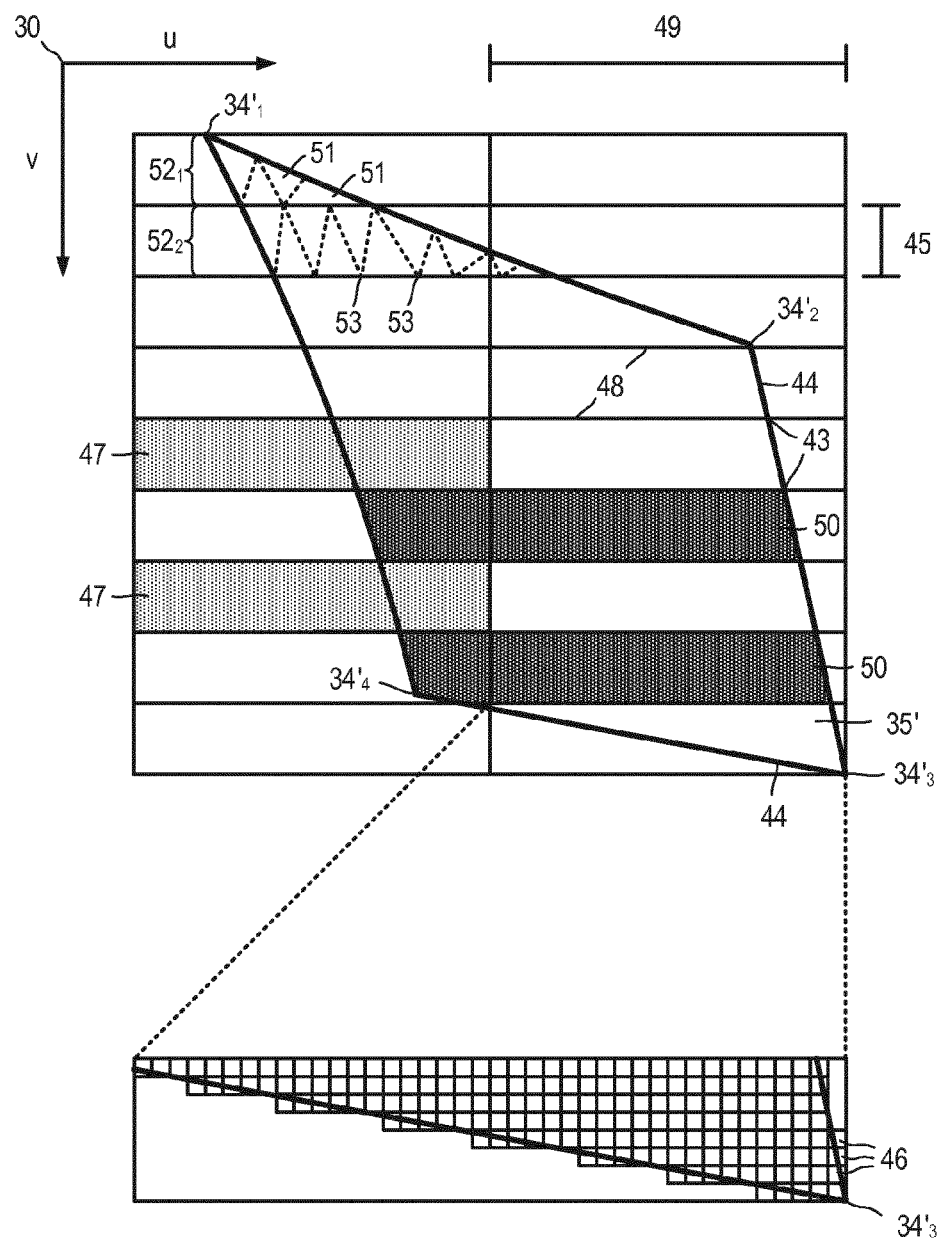
FIG. 16 illustrates a section of a reference input image in source coordinates u, v divided into strips of block line-memory.

Referring now to FIGS. 14 to 16, initial hit-points 43 (also called "initial intersection points") are iteratively added in pairs to the edges 44 of the region 35 in destination coordinates 32 (steps S4 and S5). Starting from starting point 41, one of the initial hit-points $43_1$ in a pair is added to the edge 44 along the clockwise path 8o and the other member of the pair of initial hit points $43_{22}$ is added to the edge 44 along the counter clockwise path 81. Pairs of initial hit-points ($43_{11}$, $43_{22}$) along edge 44 have the same v coordinate in the source coordinate system 30. Spacing between initial hit-points 43 is determined by a height 45 in pixels 46 of a block of line memory 47.

Optionally, initial hit-lines 48 are generated, iteratively, between each pair of initial hit-points 43 as each pair of initial hit-points 43 is generated (step S6). However, initial hit-lines may first be generated after some refinement of the position of the initial hit-points 43. At this stage, initial hit-lines 48 are straight.

Referring particularly to FIG. 16, the block line memory 47 (or "cache memory") is divided into 128 pixels or 256 pixels of even and 128 pixels or 256 pixels of odd bit 7 or bit 8 of u-coordinates, allowing for a "safe area of overlap" of 256 pixels in the u-dimension. One cache-line can hold exactly 256 bytes of image data. Depending on the number of bytes per pixel (BPP), this results in either 128 pixels per cache line (2 BPP) or 256 pixels (1 BPP). For this reason, the even/odd cache-line is either decided by bit 8 of x-coordinate (1 BPP) or bit 7 (2 BPP). If a section 35' in source coordinates 30 has a size in pixels 46 greater than a length 49 of block of line memory 47, addition line memory blocks 47 can be added until they encompass the whole area of section 35'.

Initial hit-lines 48 in sections 35 may be further refined which will be explained in more detail hereinafter (steps S7 to S10).

Figure 17:
FIG. 17 illustrates an example of block line memory.

Referring to FIG. 17, an example of two blocks 47 of line memory (i.e., cache memory) side-by-side are shown. Each line memory block 47 may comprise sixteen lines of 256 bytes. A line memory block 47, however, can have fewer or more lines and/or can comprise fewer (e.g., 64 bytes) or more bytes in each line.

There may be 2×16 lines of 256 bytes including one "even" block of line memory 47 and one "odd" block of line memory 47. Adjacent blocks of line memory 47 do not necessarily hold adjacent lines of image data 9, however, coordinates of vertices 53 are created in a way that is continuous through adjacent blocks of line memory 47. The active block between a "previous" and a "current" line in a block of line memory 47 may wrap around the image data 9, for example, when using v-coordinates from 24 to 34 there will be cache memory lines 8-15 filled with an "upper part" of the image data 9, lines 0-2 with a "lower part" of image data 9.

The number of used lines is kept two below the number of available lines to allow bilinear filtering plus rounding error margin. For example, a line memory block 47 that spans the height 45 of one strip 50 may be half number of lines available minus two.

Figure 18:
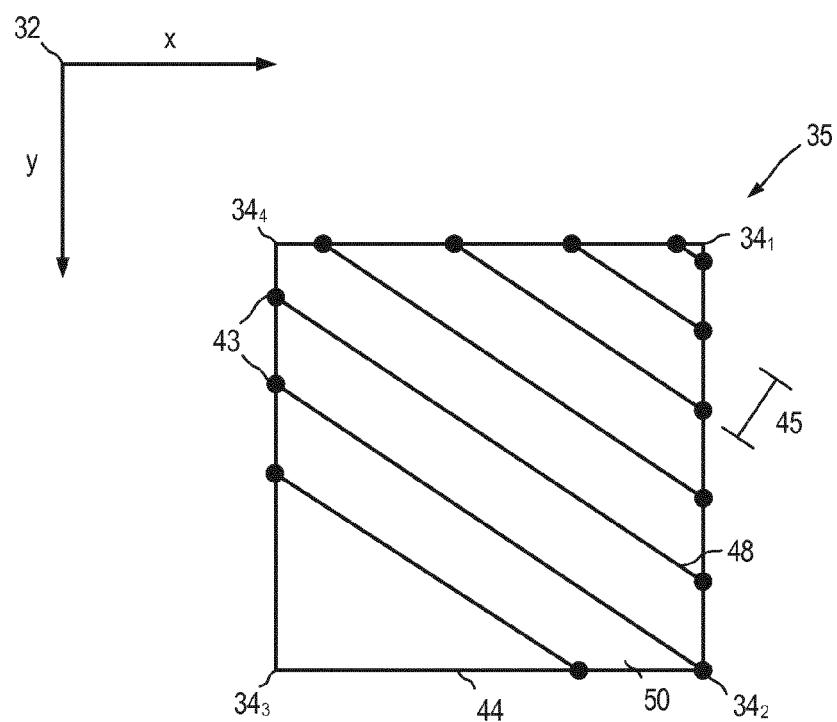
FIG. 18 illustrates an example of a section in destination coordinates x, y and initial hit-points and initial hit-lines.

Referring again to FIG. 16 and also FIG. 18, adjacent initial hit-lines 48 form first and second boundaries of strips 50 in section 35. Strips 50 are divided into triangles 51 to make triangle strips 52 (step S11). A first triangle strip may be generated between the first initial hit-line 48 and an adjacent portion of an edge 44. Triangle strips 52 are generated starting with the strip adjacent to the starting point 40 and moving towards finish point 42. A triangle strip 52 is generated along the strip 50 between the edges 44 and the final hit-line 48 generated. The coordinates of the vertices 53 of the triangles 51 in both the source and destination coordinate systems 30, 32 are stored as an ordered list of coordinates along with a TRI command which may be stored as part of a display list 22 (step S12). A single triangle 51 may span across a plurality of blocks of line memory 47.

With such a display list 22, it is possible to lay out triangles 51 in such a way that texture coordinate 30 access best utilizes the texture cache 21, staying within a 'working set' until all loaded pixels 46 are have been fetched, processed or accessed. Processing (or loading) is done by cache hardware (HW) when a miss occurs. Being able to efficiently fetch, process or access strips 50 of section 35' into a texture cache 21 in this way reduces the number of blocks of line memory 47 needed to load one strip of image data 9, reducing unnecessary cash trashing. Reduced cache trashing reduces the overhead of the hardware, saving memory (for example DRAM) bandwidth, resulting in a faster and more efficient process.

The display list 22 also allows the generation of an access pattern in form of triangle-strips 52 which may be used to fetch, process or access distorted image data 9 using a "double-buffer"-like technique. With some hardware application processors, "pre-fetching" instructions may be issued, allowing the hardware advanced notice that access to a specific range of pixels will commence soon after the initial instructions are given.

Further details of triangle strip 52 generation are explained hereinafter.

Hit-Point and Hit-Line Refinement

Figure 19:
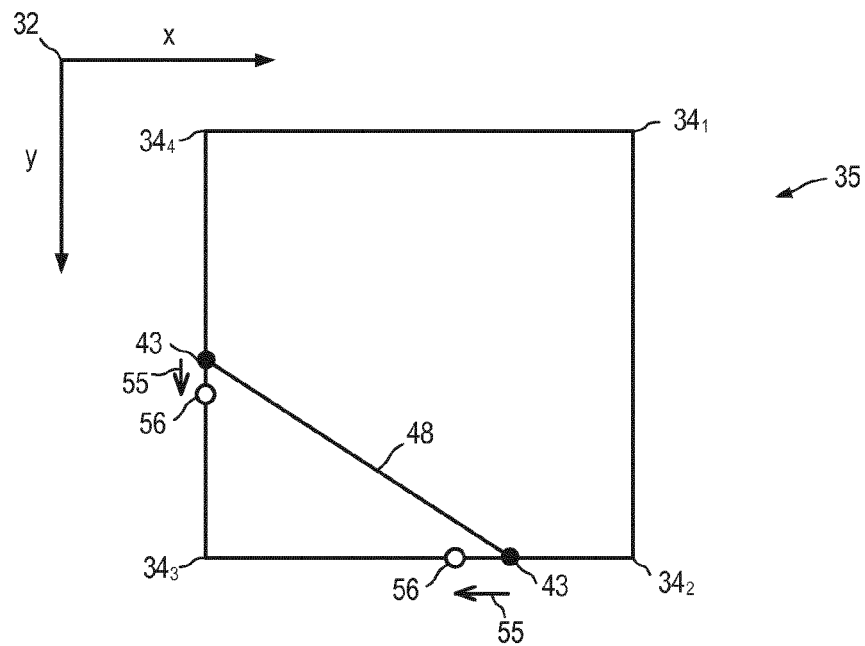
FIG. 19 illustrates an example of refinement of a first pair of hit-points shown in FIG. 18.
Figure 20:
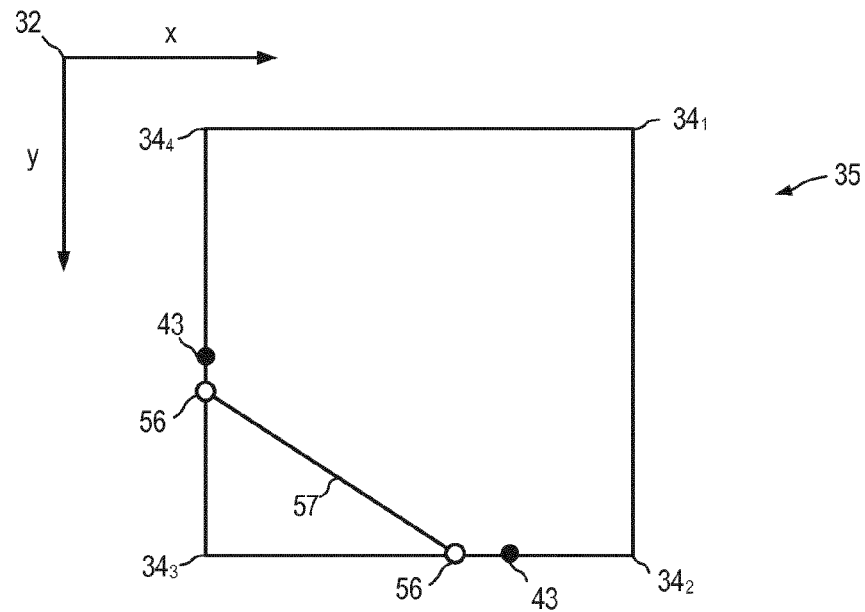
FIG. 20 illustrates an example of refined hit-points and the refined hit-line shown in FIG. 19.

Referring particularly to FIGS. 18, 19 and 20, to better use block line memory 47 in the source coordinate system 30, each pair of initial hit-points 43 and (optional) initial hit-line 48 may be refined 55 generating refined hit-points 56 and refined hit-lines 57 so that a span between refined hit-lines matches block line memory 47 height 45 in a source coordinate system 30 (steps S7 and S8). The initial hit points 43 and the initial hit-lines 48 are generated and refined iteratively in an order determined by clockwise and counter clockwise paths 80, 81 between starting point 41 and finishing point 42. If the optional initial hit-lines 48 are not generated, refined hit-lines 57 (also referred to as "straight hit-lines") are the first hit-lines to be generated. These hit-lines 57 are generated between pairs of refined hit points 56. FIG. 18 shows all initial hit-points 43 and initial hit-lines 48 for illustration only. Any suitable refinement process can be used, for example, the Secant method.

Figure 21:
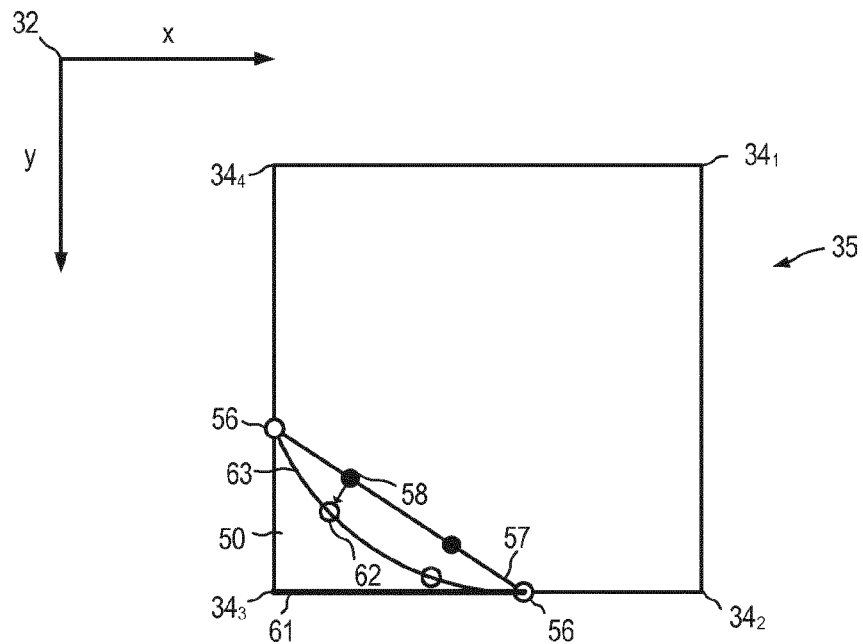
FIG. 21 illustrates an example of addition and refinement of intermediate line-points, and further refinement of the refined hit-line shown in FIG. 20.
Figure 22:
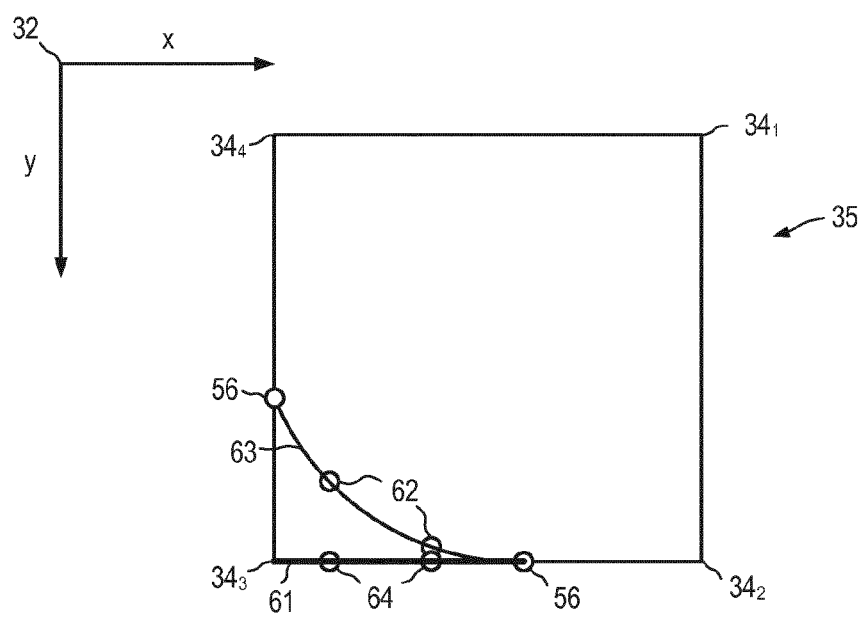
FIG. 22 illustrates an example of final position intermediate hit-points and final position hit-line.
Figure 23:
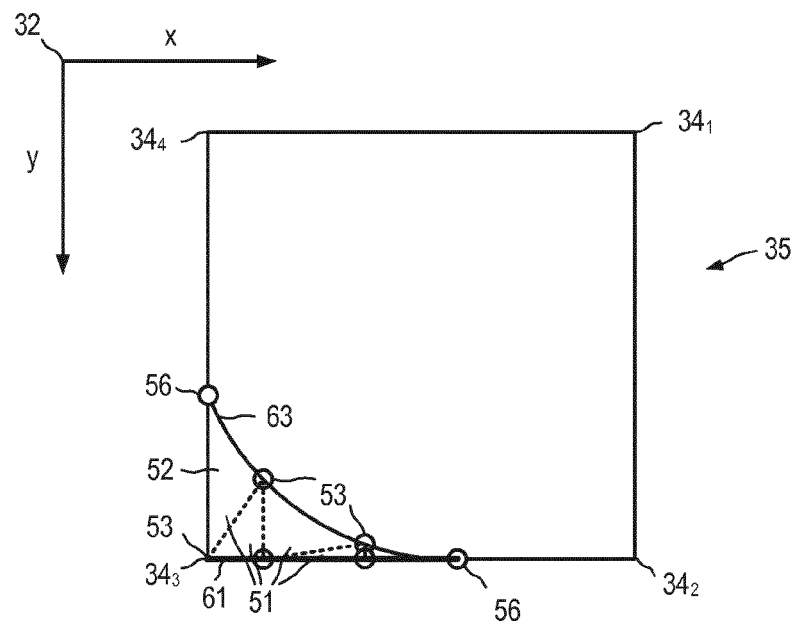
FIG. 23 illustrates an example of triangles generated to form a first triangle strip in a strip shown in FIG. 22.

Referring to FIGS. 21, 22 and 23, refined hit-lines 57 are lines between pairs of refined hit-points 56. Refined hit-lines 57 may generate boundaries of block line memory 48 which are not able to efficiently load a whole section 35' in source coordinates. Therefore, a number of intermediate line points 58 are generated along each refined hit-line 57. The intermediate line points 58 are added along refined hit-lines 57 at a distance matching an edge of a desired triangle 51 size (step S9).

Still referring particularly to FIGS. 21, 22 and 23, during the first iteration in each section 35, a first-line 61 is generated in the destination coordinate system 32 along the edge 44 between starting point 41 and first refined hit-point 56 in either a clockwise or counter clockwise direction. If no refined hit-point 56 is present on the edge 44 between the starting point 41 and the first corner point 82 encountered while moving along either the clockwise or counter clockwise paths 80, 81, the first-line 61 is generated between the starting point and the first corner point 82 ($34_2$ in FIG. 22) encountered. In FIGS. 18 to 24, the clockwise path 8o moves from starting point 41 (also identified as vertex $34_3$) along an edge 44 to a first corner point 82 (also identified as vertex $34_4$) and then along an edge 44 until a finishing point 42 (also identified as vertex $34_1$) is reached. The counter-clockwise path 81 moves from starting point 41 (also identified as vertex $34_3$) along an edge 44 to a first corner point 82 (also identified as vertex $34_4$) and then along an edge 44 until a finishing point 42 (also identified as vertex $34_1$) is reached.

During the first iteration, intermediate line points 58 are moved orthogonally to the refined hit-line 57, bending refined hit-line 57 as they move, until the strip 50 between a hit-line being actively processed and the first line 61 of the section 35 has a size in pixels 46 matching the triangle 51 size (step S10). Final position intermediate hit-points 62 lie along the final position hit-line 63. The final position hit-line 63 may be curved.

Referring particularly to FIG. 22, first-line-points 64 are generated on the first-line 61. The first-line-points 64 are spaced evenly along first-line 61. A number of first-line-points 64 are equal to a number of final position hit-points 61 along a closest final position hit-line 62 from the starting point 41.

During each iteration from the second iteration to the penultimate iteration, the intermediate line points 58 are again moved orthogonally to the refined hit-line 57, bending refined hit-line 57 as they move, until the strip 50 between the refined hit-line being actively processed and the final position hit-line 63 processed in the previous iteration has a size in pixels 46 matching the triangle 51 size (step S10).

Figure 24:
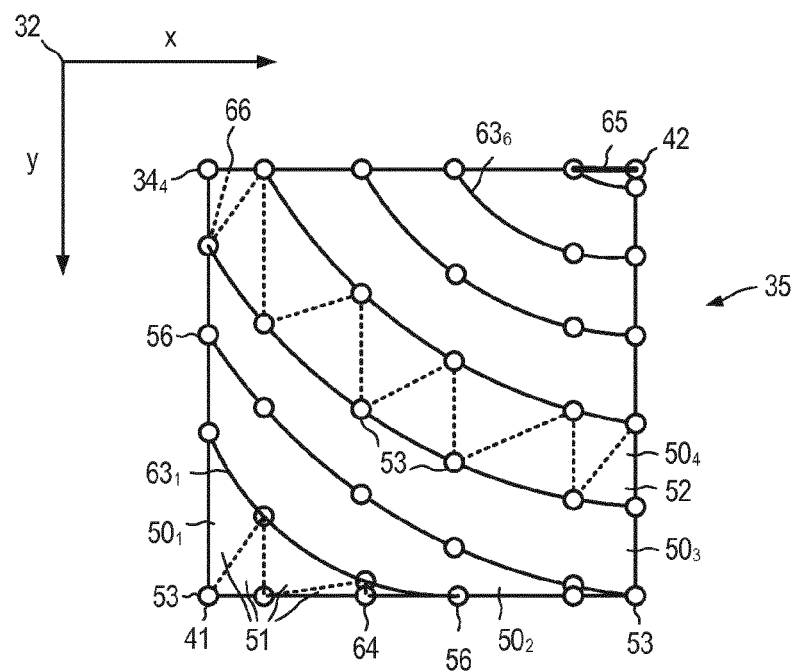
FIG. 24 illustrates an example of a section shown in FIG. 18 after final position hit-lines and final position hit-points have been generated.

Referring to FIG. 24, during the final iteration, a last-line 65 is generated for each section 35 in the destination coordinate system 32 along an edge 44 between the finishing point 42 and the last refined hit-point 56 before reaching the finishing point 42 in either a clockwise or counter clockwise direction. If no refined hit-point 56 is present on the edge 44 between the finishing point 42 and the last corner point 82 encountered when moving along either the clockwise or counter clockwise paths 80, 81, the last-line 65 is generated along whole length of edge 44 from finishing point 42 to the last corner point 82 encountered.

If a vertex 34 is adjacent to a strip 50, the vertex 34 is also used as a triangle vertex 53.

Referring still to FIG. 24, final position hit-lines 62 are drawn for each pair of final position hit-points 56. For illustration only, a triangle strip 52 is drawn in strip $50_4$.

Triangle Strip Generation

Referring to FIG. 23, triangles 51 are generated within the strips 50 of the section 35 in the destination coordinate system 32 between the first-line 61 and the final position hit-line 63, creating a triangle strip 52. The vertices 53 of triangles 51 are determined by the final position hit-points 62, the first-line-points 64 and the refined hit-points 56.

Referring to FIG. 24, triangle strips 52 are generated iteratively for each strip 50, starting from the final position hit-line 62 closest to starting point 41 and moving towards finishing point 42. The first strip 50 divided into a triangle strip 52 is bordered by final position hit-line 62 closest to starting point 41, first line 63 and edges 44. The second strip 50 divided into a triangle strip 52 is bordered by the first and second final position hit-lines 62 closest to starting point 41 and edges 44. Iterations continue until strip 50 bordering finishing point 42 is reached. Final strip 50 to be divided into a triangle strip 52 borders finishing point 42 and is bordered by final-position hit line 62, last-line 65 and edges 44.

For each iteration, there is a current final position hit-line 62 making a second boundary and a previous final position hit-line 62 making a first boundary. For the first strip 50, first line 63 is used as the previous hit-line. For the final iteration, last-line 65 is used as the current final position hit-line.

Figure 25:
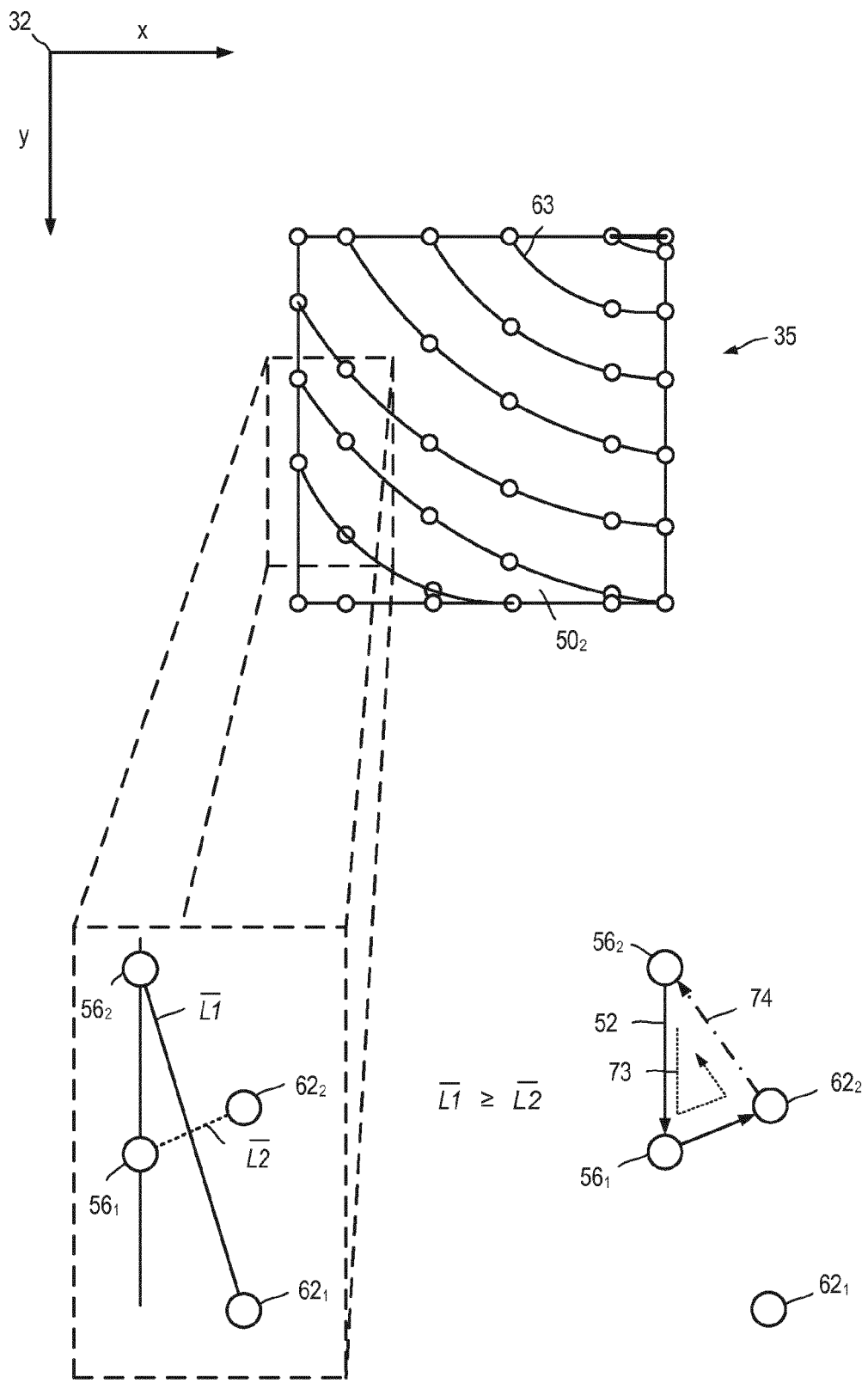
FIG. 25 illustrates generating a first triangle along a triangle strip in the section shown in FIG. 24.

Referring to FIG. 25, a first triangle is determined in second strip $50_2$. The first three points of triangle strip 52 are determined by comparing two distances, L1 and L2. L1 is a distance between the first point on the current final position hit-line and the second point along the previous final position hit-line. L2 is a distance between the first point on the previous final position hit-line and the second point on the current final position hit-line. If L1 is greater or equal to L2, the first triangle 51 in triangle strip 52 is drawn between the first two points along current final position hit line and the first point along the previous final position hit-line.

Figure 26:
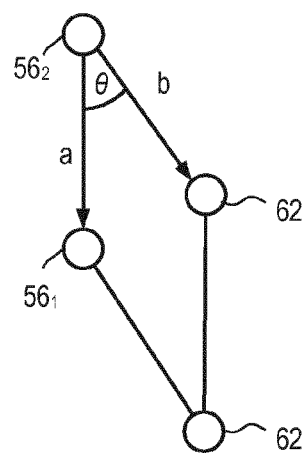
FIG. 26 illustrates how culling direction is determined.

Referring to FIG. 26, during triangle rendering, culling is a process often used on triangle-rendering hardware (HW) and application programming interfaces (APIs) to allow the removal of triangles with a specific orientation. This process is commonly referred to as "backface culling", and is used, for example, with 3D graphics hardware to check projected triangle in 2D. In some implementations, to ensure a triangle strip is rendered correctly, the triangle orientation for rendered triangles (culling=removal of triangle from render pipeline) needs to be adjusted accordingly. For this, a specific bit in a configuration register of the hardware may need to be updated by a "write register short" (WTS) instruction before the TRI command, in case the required cull direction differs from previously set up direction.

If a backface culling process is implemented, a culling direction 73 may be determined based upon the first triangle 51 in the triangle strip 52. Culling direction 73 may need to be updated accordingly by the display list 22 to allow image distortion compensation module 13 to render distorted image data 9 successfully. Culling direction 73 is based upon the triangle 51 defined by the first three triangle vertices 53 in a triangle strip 52. Some triangle rendering processes may have no backface culling. The implementation of the triangle rendering process may depend on the coordinate system (for example, right hand vs left hand sided). The rendering technique may use, for example, plane geometry.

A vector from the first point in a triangle strip 52 to a second point in the same triangle strip is labelled $\vec{a}$. A vector from the first point in a triangle strip 52 to a third point in the same triangle strip is labelled $\vec{b}$. A cross product $|\vec{a} \times \vec{b}|$ equals an area of the parallelogram spanned by $\vec{a}$ and $\vec{b}$. The sign of $\vec{a} \times \vec{b}$ determines culling direction 73. Culling direction 73 may be either clockwise or counter clockwise (i.e. using the right hand rule). The sign of $\vec{a} \times \vec{b}$ can be determined by calculating the determinant of vectors $\vec{a}$ and $\vec{b}$.

$$\vec{a} \times \vec{b} = \begin{bmatrix} a_x & b_x \\ a_y & b_y \end{bmatrix} = a_x b_y - b_x a_y$$

Figure 27:
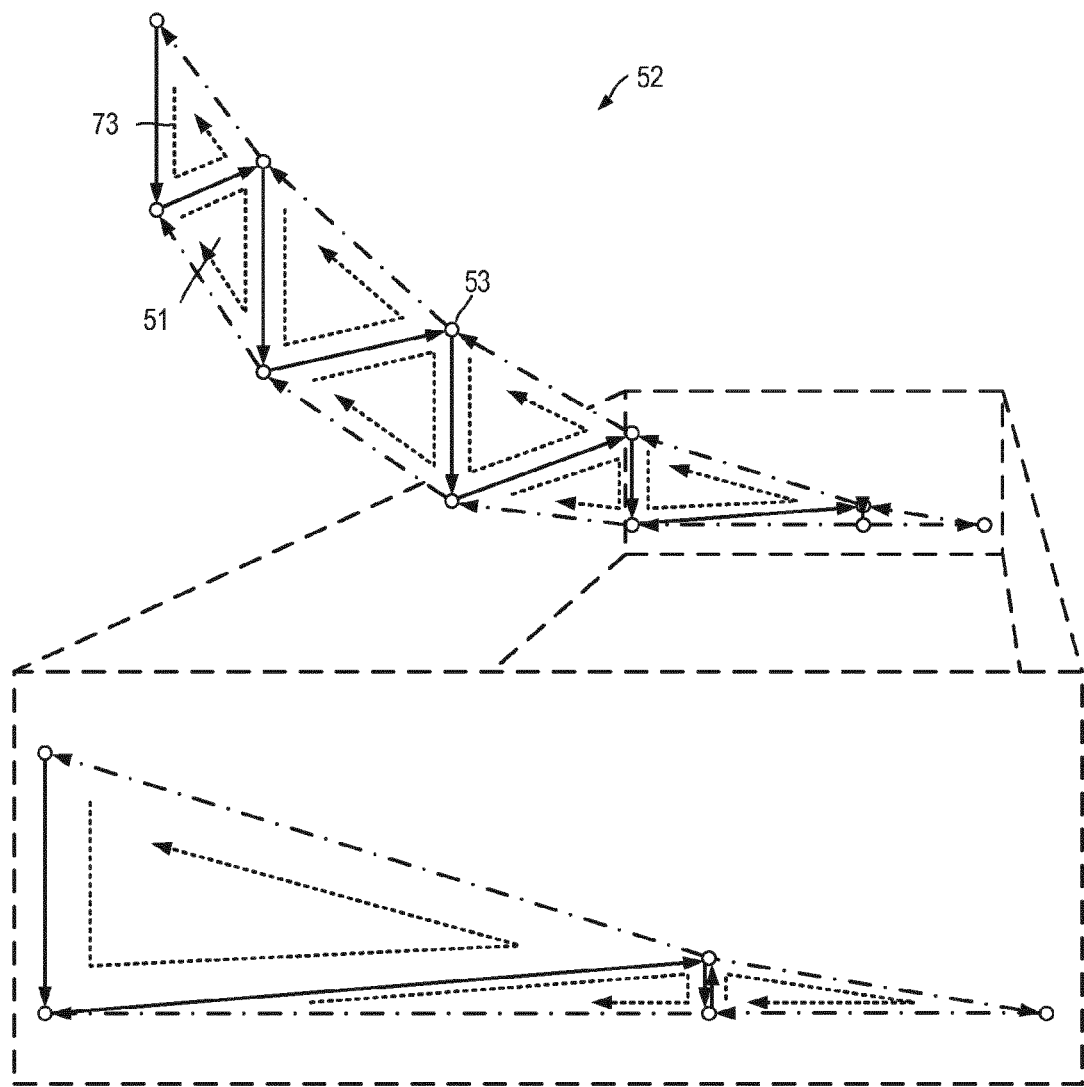
FIG. 27 illustrates generating a complete triangle strip from the section shown in FIG. 24.

Referring to FIG. 27, a strip 50 is divided into triangles with culling direction 73 typically alternating between clockwise and counter clockwise until no points remain on either current or previous final position hit-line generating a triangle strip 52. The culling direction of only the first triangle 51 in the strip 50 needs to be determined by the hardware, and the culling direction does not need to be updated with each subsequent triangle in the strip.

Figure 28:
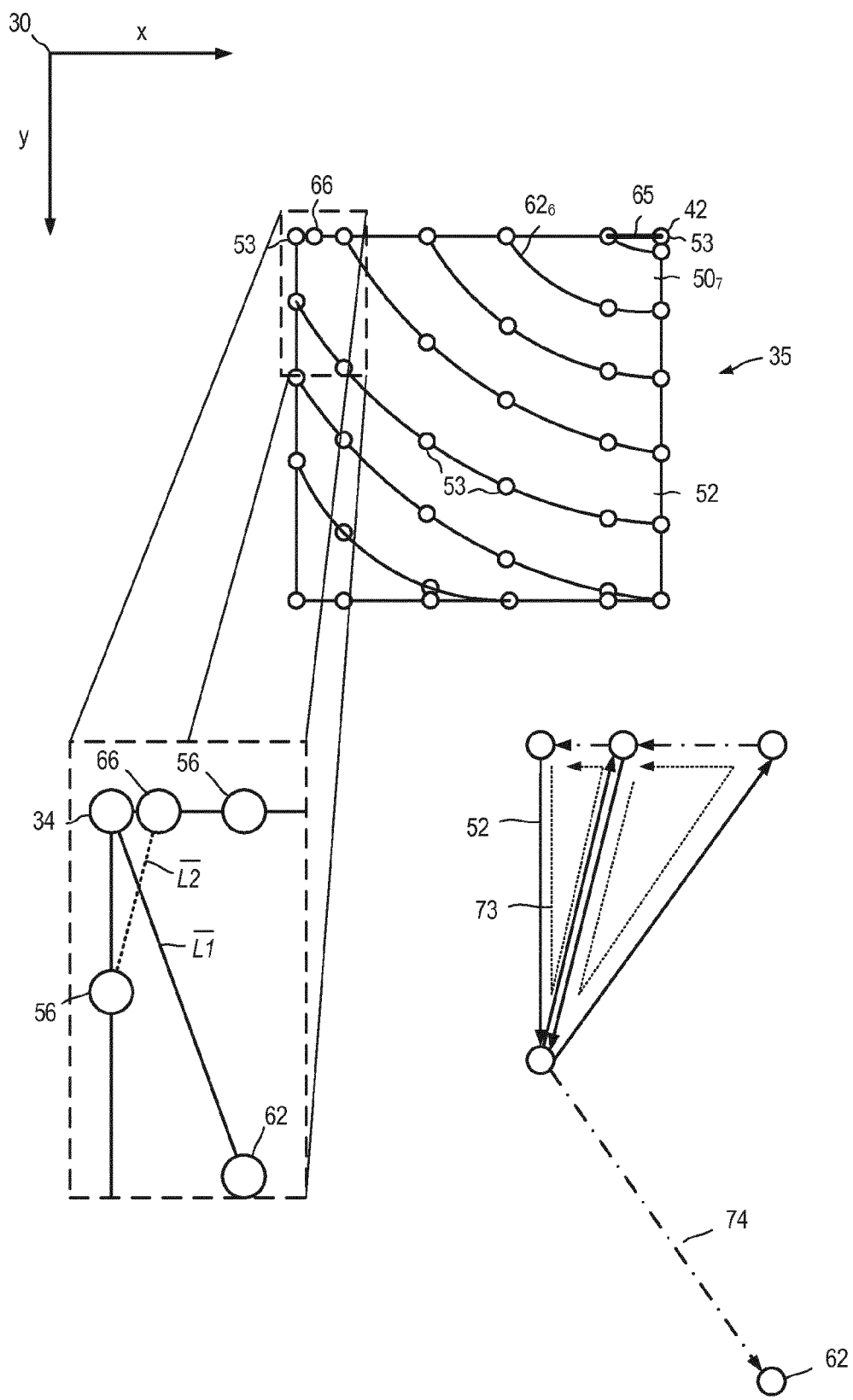
FIG. 28 illustrates adding an extra point prior to generating triangles in a triangle strip in the section shown in FIG. 24.

Referring to FIG. 28, an extra point 66 is added along edge 44 to avoid triangles degenerating. Triangle strips 52 are made, incorporating extra point 66 in the iteration.

Figure 29:
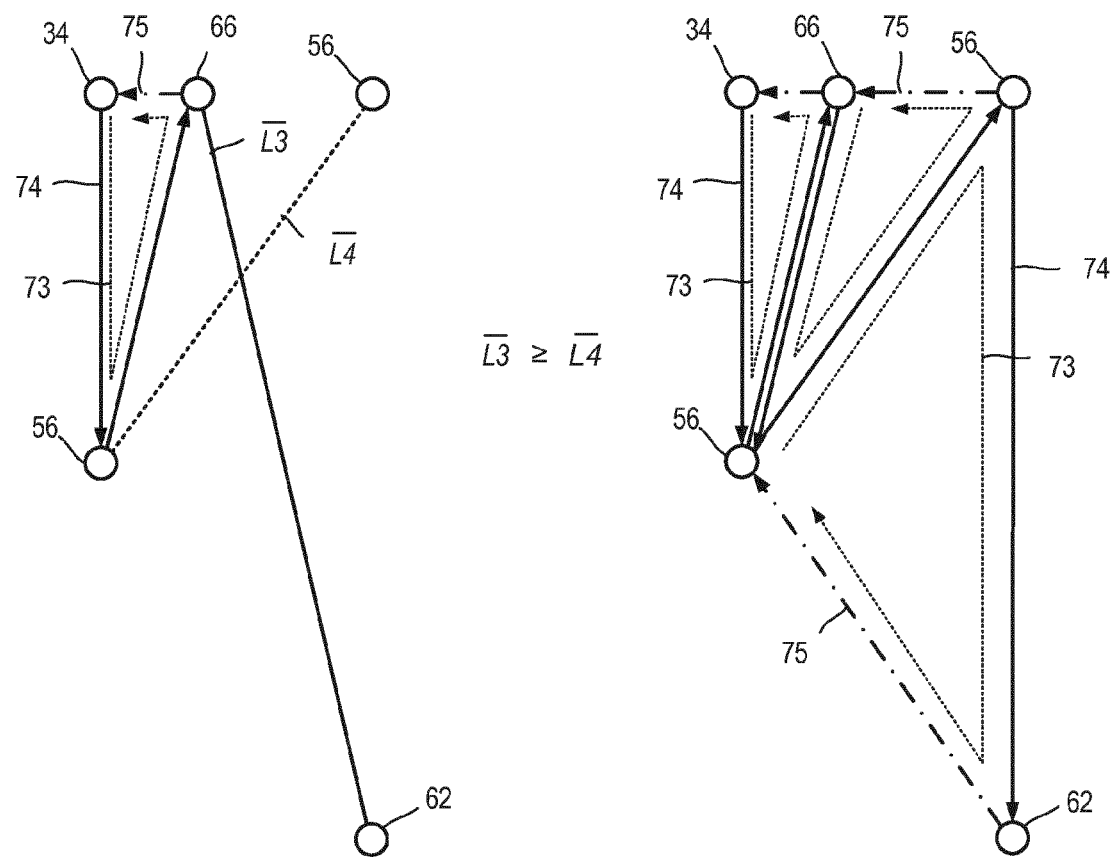
FIG. 29 illustrates a swap being required when generating a triangle strip in the section shown in FIG. 24.

Referring to FIG. 29, a "swap" is added to the triangle strip 52 to keep lengths of triangle edges connecting the previous and next final-position hit-lines as short as possible. The average connecting edges should be more or less orthogonal to the current and previous final position hit-lines 62, which gives the shortest edges. This is to avoid image quality degradation due to linear interpolation of non-linear mapping over long distances.

There are two situations where a swap may be added. A first situation is if all points of either current or previous final position hit-line have been used or distance between the last point used to make a triangle 51. A second situation is if distance (L3) between the previous point used to make the previous triangle and the next point on the previous final position hit-line is greater or equal to the distance (L4) between the previous point on the previous final position hit-line and next point on the current final position hit-line. During the process of the triangle rendering, a penalty is included for each insertion of a swap in order to avoid frequent swaps. A swap is added by adding the previous point again, resulting in a zero-sized triangle, which is typically discarded by render hardware, effectively swapping orientation of triangle. A next triangle 51 in triangle strip 52 is generated using this added point as the second point in the triangle.

Referring still to FIG. 29, minimizing the length of triangle edges in the case illustrated here would mean choosing L4 as it is shorter than L3. L4 becomes a triangle edge of two of the triangles 51 within the triangle strip 52.

Figure 30:
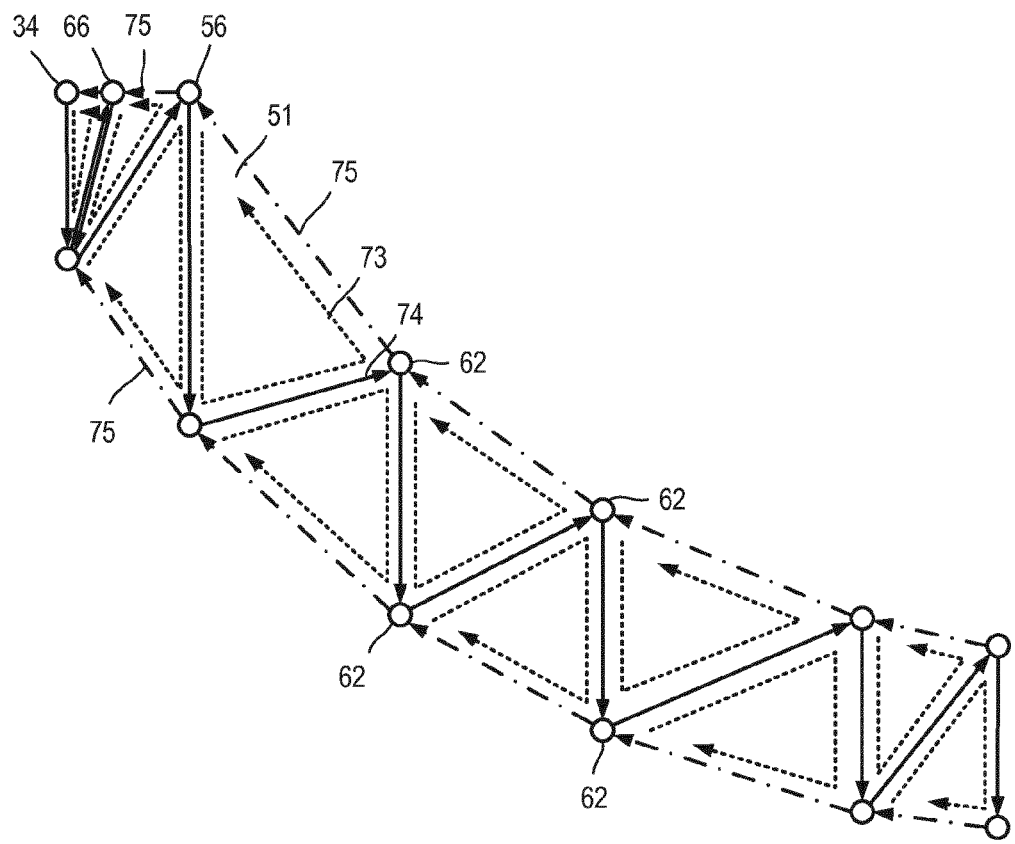
FIG. 30 illustrates an example of a complete triangle strip generated from the section shown in FIG. 24.

Referring to FIG. 30, a strip 50 of section 35 in destination coordinates has been divided into triangles 51 to make a triangle strip 52. The strip 52 includes one swap and an extra point 66.

The maximum triangle 51 size may be limited to 128 pixels due to, for example, hardware constraints. However, the maximum triangle size may be smaller or larger. There may be other constraints which dictate maximum or minimum triangle 51 sizes.

Display List Implementation

Figure 31:
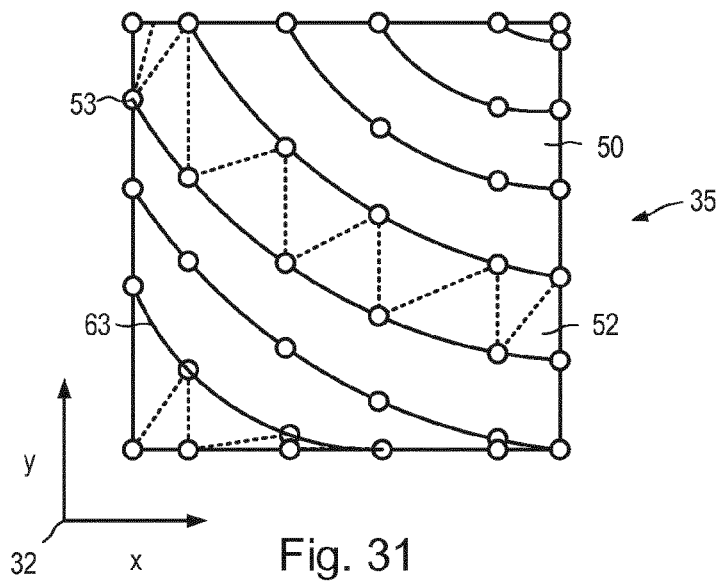
FIG. 31 illustrates an example of final position hit-lines and a triangle strip covering a section of a reference image in a destination coordinate system.

Referring to FIG. 31, an example section of distortion-corrected image data 23 in destination coordinates 32 illustrating examples of overlaid final position hit-lines 63. Final position hit-lines 63 may not meet at section interfaces. An example of a triangle strip 52 including vertices 53 is illustrated for a strip in the section.

In the destination coordinate system 32, the distortion compensation module 13 sets up triangles 51 formed in the triangle strip 52 using the ordered list of instructions (for example, a display list 22). This process generates the outer edges 44, generating scanline-wise "runs" which are clipped against destination section 35 (clip coordinates), discarding outside scanlines and/or pixels and any zero-pixel scanlines.

Each pixel 46 in the destination coordinate system 32 is entered into one or more pixel 46 processing stages where the actual texture coordinate is determined using a mapping technique between the source and destination coordinate system 30, 32. The mapping technique may be, for example, linear interpolation, barycentric coordinates, or other methods.

Another example of pixel 46 processing stages is a pixel shader in OpenGL, but with a fixed function determined by register setup.

These processes may be implemented on other hardware, for example, a consumer 3D graphics card.

Figure 32:
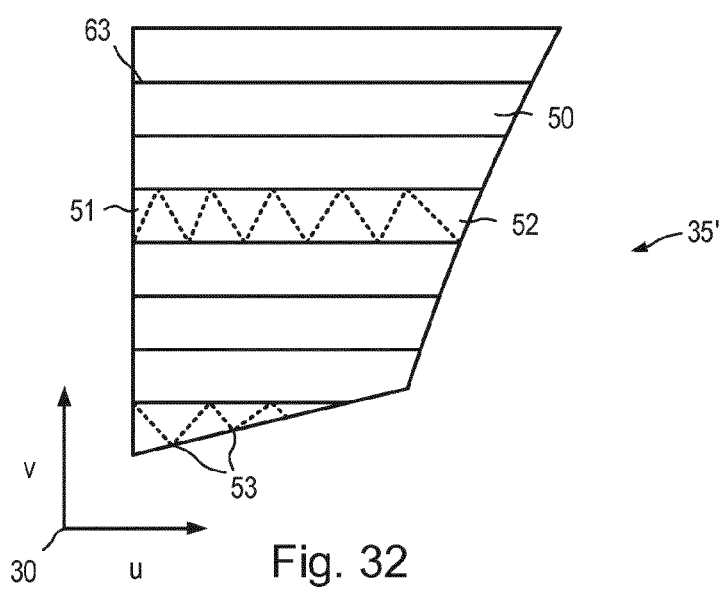
FIG. 32 illustrates an example of final position hit-lines and triangle strip covering a section of a reference image in a source coordinate system.

Referring to FIG. 32, an example section of distorted image data 9 in a source coordinate system 30. Final position hit-lines 63 overlaid for illustration. The triangle strip 52 from FIG. 23 is also illustrated here. The strip 50 is the height 45 of a line memory block 47.

Other Implementations

The ordered list of instructions generated above may be used in a wide variety of implementations for different applications such as mapping of surface textures onto a 3D mesh (also known as "texture atlas creation"), or fast rendering of 3D meshes with large texture atlas.

Such an ordered list of instructions, optimised in a similar way as described here, may be used to allow efficient rendering of large datasets, for example seismic images, where the need to load a portion of data in random-access memory (RAM), and render it, minimizing the number of loads required to render the whole dataset, thus minimising render time.

Modifications

It will be appreciated that various modifications may be made to the embodiments hereinbefore described. Such modifications may involve equivalent and other features which are already known in the design, manufacture and use of image distortion correction modules and component parts thereof and which may be used instead of or in addition to features already described herein. Features of one embodiment may be replaced or supplemented by features of another embodiment.

There may be more than one CPU.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of generating an ordered list of instructions comprising a list of pixel coordinates which are vertices of triangles) in a strip of a reference input image in a source coordinate system such that transformation of the vertices to a corresponding output image in a destination coordinate system causes the triangles to be mapped to a block of image data which maps to a block of line memory, the method comprising:
dividing the reference output image into a plurality of tiled sections in the destination coordinate system;
for each section:
defining first and second boundaries of an array of strips of pixels in the section by dividing the section into blocks of line memory, wherein a number of strips in each section is determined by transforming corners of each of a plurality of tiled sections in the destination coordinate system into the source coordinate system to generate a plurality of transformed sections;
for each transformed section:
determining a widest span in the v dimension in pixels; and
dividing a number of pixels spanning the v dimension by the height of the block of line memory; and for each strip:
dividing each set of pixels contained in each strip into a series of ordered triangles;
generating a set of destination and source coordinates for each vertex of each triangle in the strip; and
storing the coordinates of the vertices in source and destination coordinate system, in the ordered list of instructions.

2. The method of claim 1, wherein defining the boundaries of each strip in the array of strips for each section comprises:
determining a starting point and a finishing point based upon a largest span between a highest and lowest v-coordinate of an edge of a section in source coordinates;
iteratively creating pairs of initial hit-points starting at the starting point and moving clockwise and counter clockwise towards the end point;
wherein a distance between adjacent initial hit-points on the edge is determined by a triangle size;
generating initial hit-lines between each pair of initial hit-points to form boundaries of the strips.

3. The method of claim 2, wherein defining the boundaries of each strip further comprises:
iteratively moving initial hit-points along the edge to generate refined hit-points; and
generating refined hit-lines between pairs of the refined hit-points.

4. The method of claim 3, wherein defining the boundaries of each strip further comprises:
generating a series of intermediate line points along the refined hit-lines wherein a distance between the refined hit-points and the intermediate line points is determined by the triangle size;
moving intermediate line points orthogonally to refined hit-line to match the v coordinate in the source coordinate system of a refined hit-point to generate final position intermediate hit-points; and
generating final position hit-lines between each pair of refined hit-points which intersect final position intermediate hit-points.

5. The method of claim 1 wherein a first line is added to the edge adjacent to the starting point in either a clockwise or counter clockwise direction to define a boundary of the first strip of the section.

6. The method of claim 1, wherein a last line is added to the edge adjacent to the finishing point in either a clockwise or counter clockwise direction to define a boundary of the last strip of the section.

7. The method of claim 1, wherein each corner of the section are added to strips containing those corners as vertices before generating the triangles.

8. The method of claim 1, wherein vertices of a first triangle generated in each strip are determined by comparing a first distance between a first point on a first boundary and a second point on a second boundary, with a second distance between the first point on the second boundary and second point on the first boundary;
where when the first distance is greater of equal to the second distance the first two point on the first boundary are used as triangle vertices; and
where the second distance is greater than the first distance, the first two points on the second boundary are used as triangle vertices.

9. The method of claim 1, wherein a culling direction of a first triangle in strip is determined by the cross product of a vector from a first vertex to a second vertex of a first triangle and a vector form the first vertex to a third vertex of the first triangle wherein a positive cross produce results in a clockwise culling direction and a negative cross product results in a counter clockwise culling direction.

10. The method of claim 1, wherein the culling direction of consecutively rendered triangles in a strip alternates between the first triangle culling direction and an opposite culling direction.

11. The method of claim 1, wherein the culling direction of adjacent triangles in a strip is the same.

12. The method of claim 1, wherein the ordered list of instructions is a display list.

13. A non-transitory tangible computer-readable medium having instructions for performing the method of claim 1.

14. A computer system for generating an ordered list of instructions comprising a list of pixel coordinates which are vertices of triangles in a strip of a reference input image in a source coordinate system [u, v] such that transformation of the vertices to a corresponding output image in a destination coordinate system [x, y] causes the triangles to be mapped to a block of image data which maps to a block of line memory, or "texture cache", such that when read out there is no cache trashing, the computer system comprising:
   at least one processor;
   memory;
   wherein the at least one processor is configured to perform the method of claim 1.

15. A method of correcting a distorted image, the method comprising:
   receiving a distorted image from system memory into a texture cache;
   texture mapping triangles of the distorted image using coordinates of vertices of the triangles stored in an ordered list of instructions stored in system memory onto a distortion-corrected image; and
   storing this in a destination cache;
   wherein the ordered list of instructions comprises a lists of pixel coordinates which are vertices of triangles in a strip of a reference input image in a source coordinate system and a destination coordinate system such that transformation of the vertices in the source coordinate system to a corresponding output image in a destination coordinate system causes the triangles to be mapped to a block of image data which maps to a block of line memory is generated by:
   dividing the reference output image into a plurality of tiled sections in the destination coordinate system;
   for each section:
      defining first and second boundaries of an array of strips of pixels in the section by dividing the section into blocks of line memory, wherein a number of strips in each section is determined by transforming corners of each of a plurality of tiled sections in the destination coordinate system into the source coordinate system to generate a plurality of transformed sections;
   for each transformed section:
      determining a widest span in the v dimension in pixels; and
      dividing a number of pixels spanning the v dimension by the height of the block of line memory; and
   for each strip:
      dividing each set of pixels contained in each strip into a series of ordered triangles;
      generating a set of destination and source coordinates for each vertex of each triangle in the strip; and
      storing the coordinates of the vertices in source and destination coordinate system, in the ordered list of instructions.

16. A hardware module configured to perform the method of claim 15.

17. A monolithic integrated circuit comprising:
   a processor subsystem comprising at least one processor and memory; and
   the hardware module of claim 16.

18. A system comprising:
   at least one camera for providing distorted image data; and
   an integrated circuit of claim 17 arranged to receive distorted image data from the at least one camera.

19. A motor vehicle comprising:
   the system of claim 18.

20. A non-transitory tangible computer-readable medium having instructions for performing the method of claim 15.

* * * * *